United States Patent
Chang et al.

(10) Patent No.: US 6,850,508 B1
(45) Date of Patent: Feb. 1, 2005

(54) APPARATUS AND METHOD FOR EXCHANGING VARIABLE-LENGTH DATA ACCORDING TO A RADIO LINK PROTOCOL IN A MOBILE COMMUNICATION SYSTEM

(75) Inventors: Hoon Chang, Seoul (KR); Hyun-Seok Lee, Songnam-shi (KR); Dae-Gyun Kim, Seoul (KR); Chang-Hoi Koo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/575,759

(22) Filed: May 22, 2000

(30) Foreign Application Priority Data

May 21, 1999 (KR) ................................ 10-1999-0018566

(51) Int. Cl.[7] .............................................. H04B 7/216
(52) U.S. Cl. ...................................... 370/335; 370/441
(58) Field of Search ................................ 370/277, 310, 370/310.2, 315–324, 328, 329, 335–337, 338, 342–350, 389, 392, 431–444, 513, 514, 546, 256

(56) References Cited

U.S. PATENT DOCUMENTS

| 6,088,342 A | * | 7/2000 | Cheng et al. | ................ 370/320 |
| 6,317,430 B1 | * | 11/2001 | Knisely et al. | ............. 370/394 |
| 6,507,582 B1 | * | 1/2003 | Abrol | .......................... 370/394 |
| 6,553,003 B1 | * | 4/2003 | Chang | .......................... 370/256 |

* cited by examiner

Primary Examiner—Afsar Qureshi
(74) Attorney, Agent, or Firm—Dilworth & Barrese LLP

(57) ABSTRACT

A device for generating a block sequence number in a communication system for transmitting frames comprised of a block sequence number and a succeeding data field. The block sequence number is assigned to every block unit corresponding to a multiple of the byte to transmit the increased number of data bits, so that the data bits in at least one of the frames can be verified in byte unit at a receiving side. A difference D is calculated between a first byte sequence number A of m bits indicating a first byte of transmission data and a second byte sequence number B of m bits indicating data of the first byte in a second block succeeding a first block to which the transmission data belongs. The first byte sequence number A is converted to a block sequence number of n bits smaller in number than m bits using difference D.

4 Claims, 13 Drawing Sheets

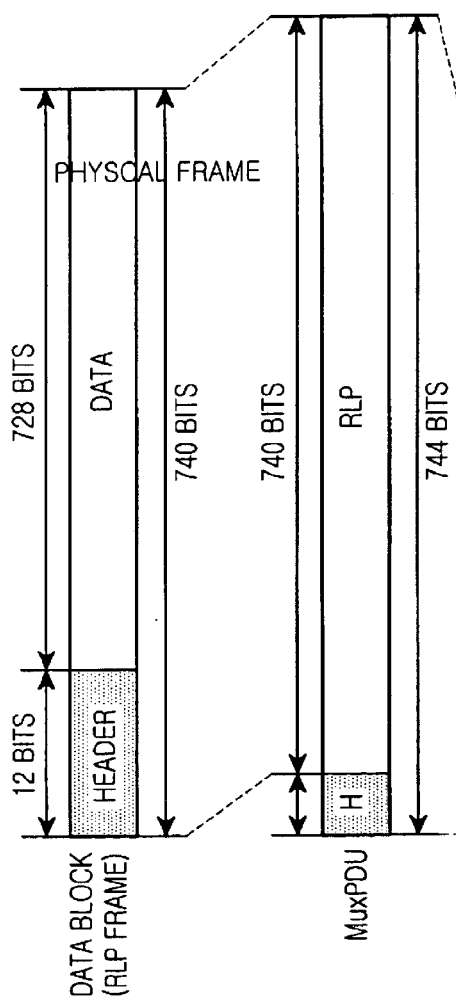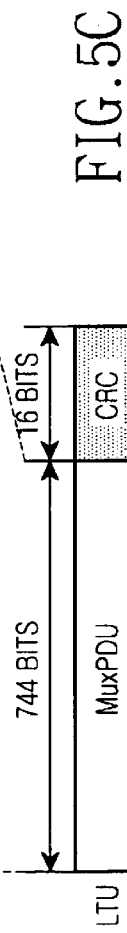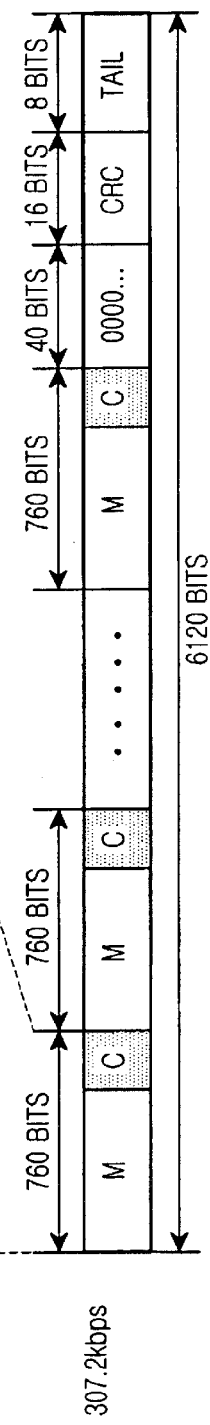
FIG.5A  FIG.5B  FIG.5C  FIG.5D

IDLE FRAME (1/8 RATE ONLY)

STATUS SYNCHRONIZATION FRAME

APPARATUS AND METHOD FOR EXCHANGING VARIABLE-LENGTH DATA ACCORDING TO A RADIO LINK PROTOCOL IN A MOBILE COMMUNICATION SYSTEM

FIG. 1 shows an exemplary packet data service defined by the CDMA-2000 standard. In FIG. 1, a mobile station (MS) includes a terminal equipment (TE) and a mobile termination or terminal (MT). A base station is represented by BS/MSC (Base Station/Mobile Switching Center), and an interworking function block (IWF) connects the BS/MSC to a data network (e.g., Internet). The IWF block is a device for converting protocols from one to another, when different protocols are used. In FIG. 1, the upper layer service (or Web service) processors of the mobile station and the IWF block form messages which are passed down through a network protocol (e.g., Internet protocol (IP)) processor and a link protocol (e.g., point-to-point protocol (PPP)) processor. Then, the data assembled by the upper layer service processors is finally transmitted to the lower layers in the form of a link protocol packet, and the lower layers transmit the data using a proper protocol (e.g., EIA-232, RLP, etc). Although the term "processor" is used herein, it would be understood by one skilled in the relevant art that these are "processes" that may be performed on one or more processors or devices.

FIG. 1 shows an example where an EIA-232 controller is used between the TE and the MT. Generated RLP frames are transmitted over a physical channel connected according to the IS-2000 standard, which is part of the CDMA-2000 standard. The RLP packets received at the base station over the connected physical channel are restored back to link protocol packets and the restored packets are transmitted to the IWF block through the relay layer. In general, interfacing between the base station and the IWF block is performed according to the IS-658 standard. In the IWF block, the link protocol layer reads data from the link protocol packets and transmits the data to the network protocol processor, where the data is finally transmitted to the upper service processor. The distribution of link protocol packets into radio link protocol (RLP) frames through the RLP is one of the subjects of the present invention.

Above, a description has been made of a process for transmitting data from the mobile station to the base station, and it should be noted that the process for transmitting the data from the base station to the mobile station can be performed in a similar manner. To provide various services, the CDMA-2000 standard supports various schemes different from that of FIG. 1. However, they have a common feature in that the link protocol packets with the upper service data are transmitted over the radio physical channel through the RLP.

The RLP Type-3 specification generates only the RLP frame having a size proper to fill a physical channel frame of 9.6 Kbsp or 19.2 Kbps for the current Rate Set 1, or the RLP frame having a size proper to fill a physical channel frame of 14.4 Kbps or 28.8 Kbps for the Rate Set 2. Therefore, when the physical channel operates at the higher rate of 153.6 Kbps or 230.4 Kbsp, a method is used for filling several RLP frames in one physical channel frame. If the physical channel supports a rate over 153.6 or 230.4 Kbps (which is the maximum rate supported in the RLP Type-3 specification), for example, if the physical channel supports the rates of 307.2 Kbps, 460.8 Kbps, 614.4 Kbps and 1036.8 Kbps, more RLP frames can be filled in one physical channel frame. However, as compared with the method for filling one physical channel with one large-sized RLP frame, this method causes an increasing burden on the frame header and unusable parts of the frame, thereby decreasing the frame efficiency. Therefore, to transmit a RLP frame with a size larger than the current RLP Type-3 frame, a new method is required.

SUMMARY OF THE INVENTION

An object of the present invention is to enable transmission and reception of an RLP frame on a block unit basis to transmit and receive the increased amount of data thereby to increase transmission efficiency in a mobile communication system.

Another object of the present invention is to transmit an RLP frame on a block unit basis and enable retransmission in a block unit in a mobile communication system.

Further another object of the present invention is to enable transmission and retransmission of an RLP frame in a block unit in a mobile communication system.

To achieve the above and other objects, there is provided a method for generating a block sequence number in a communication system for transmitting frames wherein each frame is comprised of a block sequence number and a succeeding data field which is filled with data bits having a byte length, the block sequence number being assigned to every block unit corresponding to a multiple of the byte to transmit the increased number of data bits, so that the data bits in at least one of the frames can be verified in byte unit at a receiving side. The method comprising calculating a difference D between a first byte sequence number A of m bits indicating a first byte of transmission data and a second byte sequence number B of m bits indicating data of the first byte in a second block succeeding a first block to which the transmission data belongs; and converting the first byte sequence number A to a block sequence number B_SEQ of n bits smaller in number than m bits using the difference D. The difference D is calculated by using the equation $D=\{A-B+2^m\}$ modulo $2^m$ and the block sequence number B_SEQ is calculated using the equation $B\_SEQ=\{B(N_R)+FLOORING(D,C)/C\}$ modulo $2^n$, where FLOORING (D,C) is a function for calculating a minimum value which is smaller than or equal to D and is a multiple of C, $B(N_R)$ indicates a value determined by converting the second byte sequence number B of m bits to n bits, and C indicates a size of the frame.

BRIEF DESCRIPTION OF THE DRAWINGS

The above and other objects, features and advantages of the present invention will become more apparent from the following detailed description when taken in conjunction with the accompanying drawings in which:

FIGS. 5A to 5D are diagrams illustrating a format of the frames generated according to an embodiment of the present invention;

DETAILED DESCRIPTION OF THE PREFERRED EMBODIMENT

A preferred embodiment of the present invention will be described herein below with reference to the accompanying drawings. In the following description, well-known to functions or constructions are not described in detail since they would obscure the invention in unnecessary detail.

Figure 1:
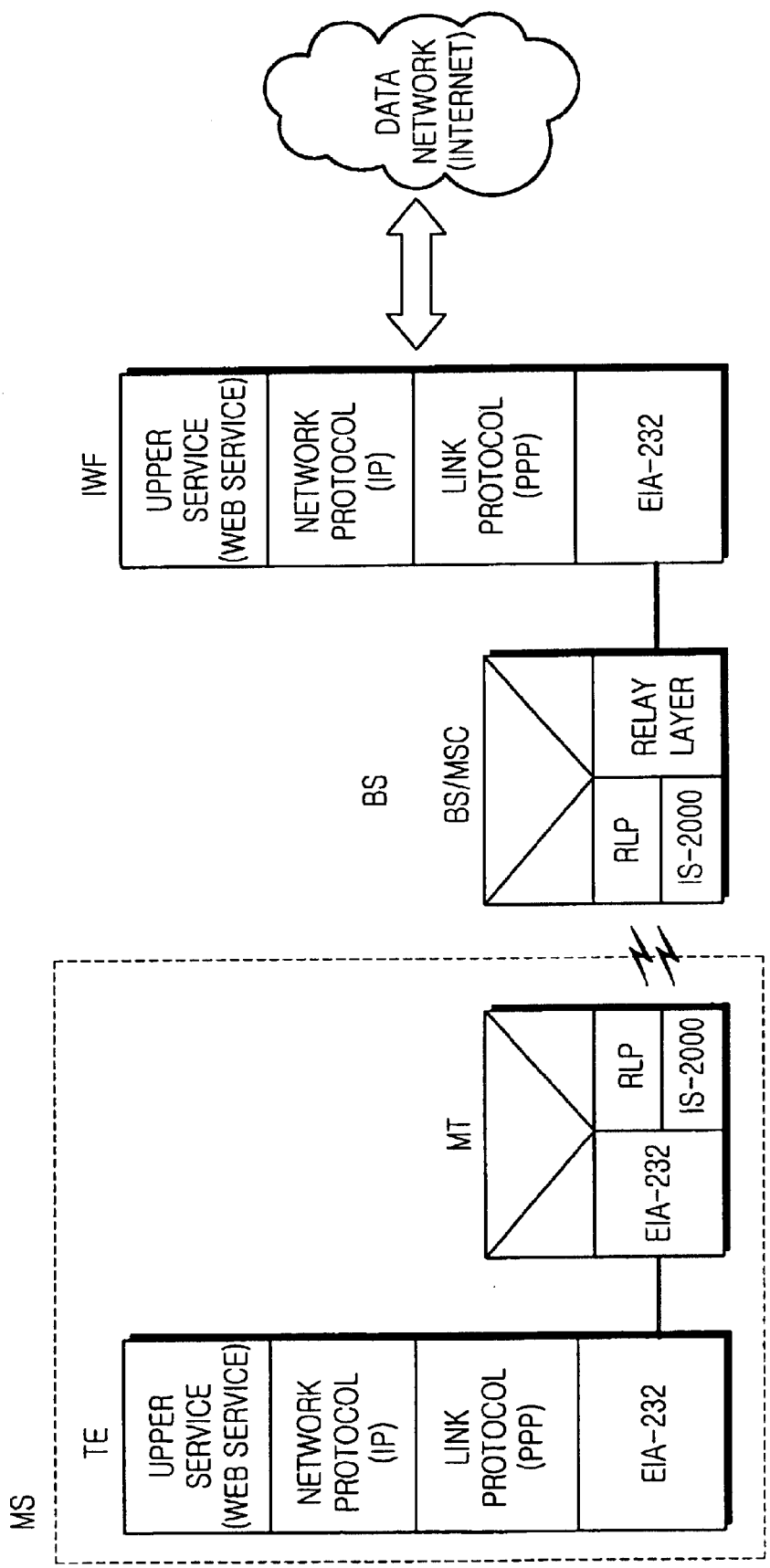
FIG. 1 is a diagram illustrating a general CDMA communication system for performing a packet data service.
Figure 2:
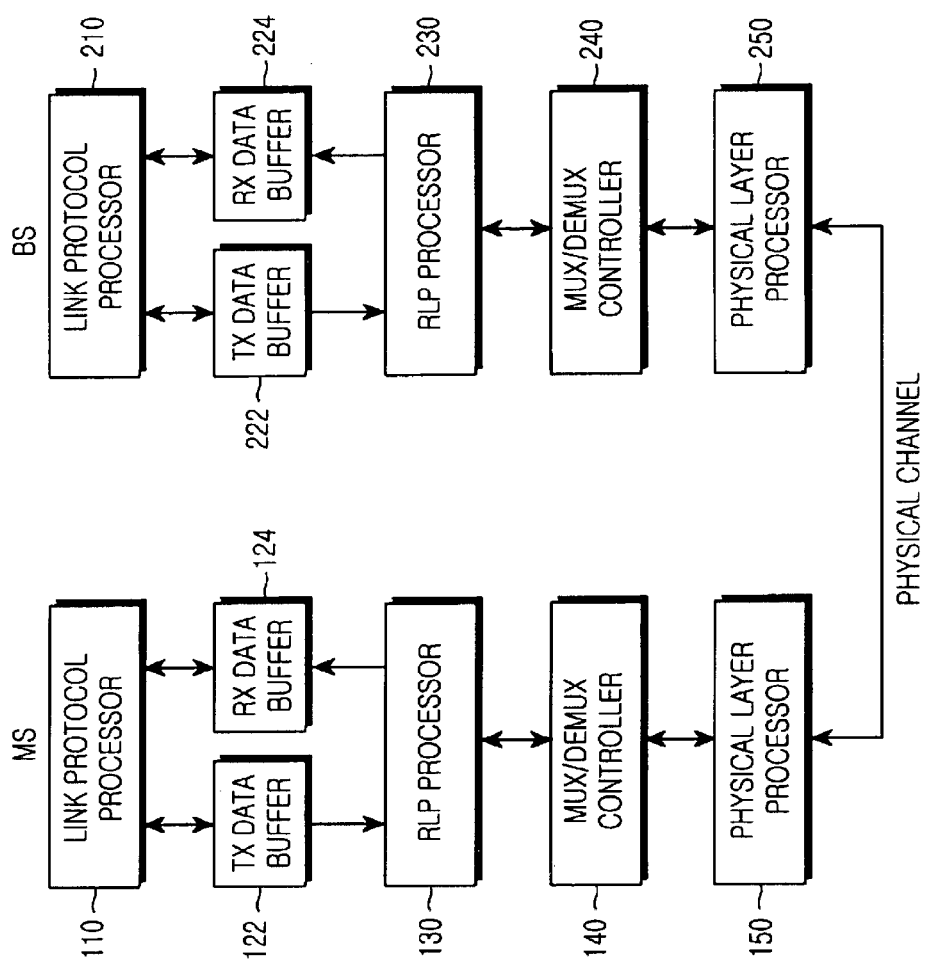
FIG. 2 is a diagram illustrating a device for transmitting and receiving data according to the RLP, to which the present invention is applicable.

FIG. 2 shows a structure of a mobile communication system for transmitting and receiving data according to the RLP, to which the present invention is applicable.

Referring to FIG. 2, physical layer processors 150 and 250 connect a physical channel between the mobile station and the base station, respectively, according to the IS-2000 specification, transmit the RLP frames provided from associated RLP processors 130 and 230, respectively, to the other party's physical layer over the connected physical channel, and transmit the RLP frames received over the physical channel to RLP processors 130 and 230, respectively. Multiplexing/demultiplexing controllers 140 and 240 are interposed between the respective RLP and physical layer processors.

Multiplexing/demultiplexing controllers 140 and 240 have the multiplexing function of attaching the destination and size information at the head of the RLP frames received from RLP processors 130 and 230, respectively, and transmitting the multiplexed RLP frames to the physical layer processors 150 and 250, respectively. Further, the multiplexing/demultiplexing controllers 140 and 240 have the demultiplexing function of detecting the destination and size information of RLP frames received from the physical layer processors 150 and 250, respectively, and then transmitting the detection results to the upper RLP processors 130 and 230, respectively. Transmission data buffers 122 and 222 are memory devices for storing data received from link protocol (i.e., PPP) processors 110 and 210. The transmission data buffers 122 and 222 segment in sequence the stored packets by the required size at the request of the RLP processors 130 and 230, respectively. The reception data buffers 124 and 224 store in sequence the data provided from the RLP processors 130 and 230, respectively. The stored data is transmitted to the PPP processor or the IWF block by the EIA-232 controller or the IS-658 controller. The EIA-232 controller or the IS-658 controller operates according to the EIA-232 specification or the IS-658 specification, respectively, and performs or controls data exchange between the data buffers 122, 124, 222 and 224 and the link protocol processors 110 and 210. For the current CDMA-2000 packet service, it is possible to use a controller other than the EIA-232 controller and the IS-658 controller. For this reason, the controllers are not shown in FIG. 2.

Figure 3:
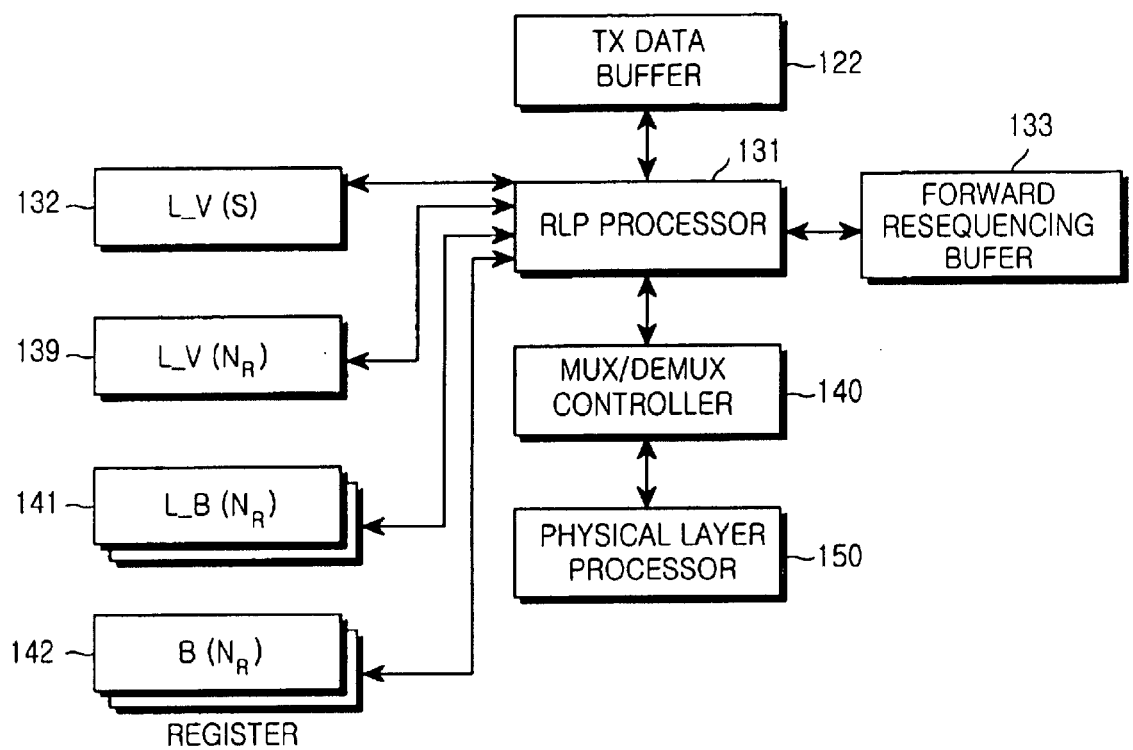
FIG. 3 is a diagram illustrating a data transmitter according to an embodiment of the present invention.

FIG. 3 shows a data transmitter according to an embodiment of the present invention. Referring to FIG. 3, the RLP processor 130 for transmitting the RLP frame includes an RLP controller 131, an L_V(S) register 132, a forward resequencing buffer (or retransmission buffer) 133, and an L_V($N_R$) register 139. Further, the RLP processor 130 includes multiple L_B($N_R$) registers 141 and multiple B($N_R$) registers 142. The B($N_R$) registers 142 are equal to the L_B($N_R$) registers 141 in number.

The RLP controller 131 generates an RLP frame by receiving data from the transmission data buffer 122 and transmits a data block with the generated RLP frame to the multiplexing/demultiplexing controller 140. The forward resequencing buffer 133 is a memory device for storing resequencing data. The RLP controller 131 retransmits data stored in the forward resequencing buffer 133 when the value of the L_V(S) register 132 is smaller than the value of the L_V($N_R$) register 139.

The L_V(S) register 132 stores, when transmitting the data on a byte unit basis, a sequence number of each byte. The L_V($N_R$) register 139 stores a sequence number of the damaged data byte that the receiver has failed to receive. The stored sequence number is provided from the receiver. The L_B($N_R$) register 141 stores a reference sequence number of a block calculated using the value stored in the L_V($N_R$) register 139. The reference sequence number is the sequence number of the first byte of the block. The B($N_R$) register 142 stores a 9-bit sequence number used when transmitting B grouped data bytes out of the data bytes having the sequence number stored in the L_B($N_R$) register 141. Therefore, when B data bytes are grouped out of the data bytes having the sequence number according to the addition results of the sequence number B($N_R$) stored in the L_($N_R$) register 141 and the sequence number stored in the B($N_R$) register 142, a 9-bit sequence number to be attached is {B($N_R$) register's value+1} modulo $2^9$.

In other words, when a number is sequentially assigned to the respective bytes of infinite-length data starting from '0', the L_B($N_{R)}$ register 141 stores a 20-bit sequence number that the first byte of each data block can have. Meanwhile, the B($N_R$) register 142 stores a 9-bit value converted from the 20-bit sequence number stored in the associated L_B ($N_R$) register 141.

Figure 4:
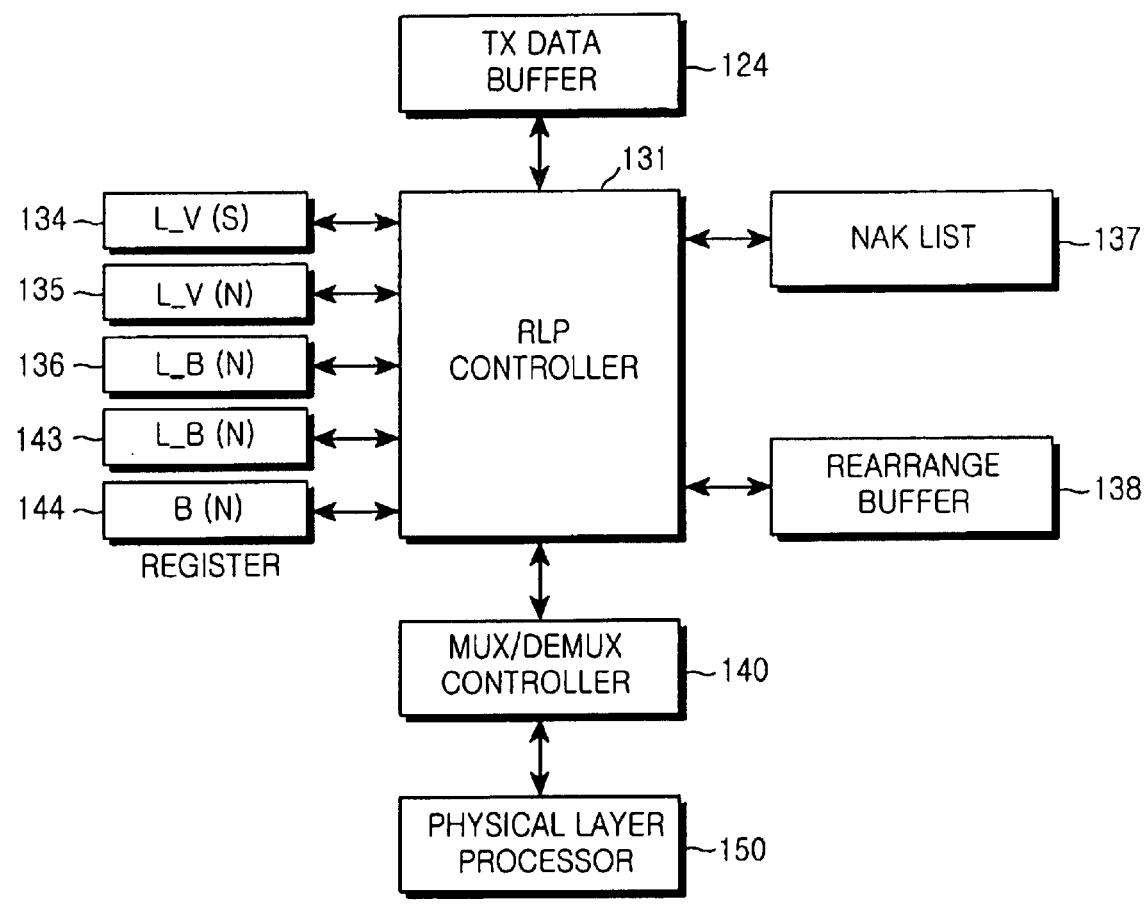
FIG. 4 is a diagram illustrating a data receiver according to an embodiment of the present invention.

FIG. 4 shows a data receiver according to an embodiment of the present invention. Referring to FIG. 4, the RLP processor 130 for receiving the RLP frame includes the RLP controller 131, an E register 134, an L_V(N) register 135, L_V(R) register 136, a NAK list 137 and a rearrange buffer 138. Further, the RLP processor 130 includes multiple L_B(N) registers 143 and multiple B(N) registers 144. The B(N) registers 144 are equal to the L_B(N) registers 143 in number.

The RLP controller 131 receives the RLP frame from the multiplexing/demultiplexing controller 140 and examines whether the data is received in order. If the data is received in order, the RLP controller 131 stores the data in the receiving data buffer 124. Otherwise, the RLP controller 131 stores the data in the rearrange buffer 138, and then records the portion (period) to be requested for retransmission in the NAK (Non Acknowledge) list 137. The portion stored in the NAK list 137 is transmitted when transmitting the next control frame. The E register 134 records the number of damaged (or bad) data blocks. When the multiplexing/demultiplexing controller 140 notifies the RLP controller 131 of the damaged data blocks, the RLP controller 131 records this value in the E register 134 to use it when reestablishment is required. The RLP controller 131 judges that new data is received, when a data byte was a sequence number larger than or equal to the value of the L__V(R) register 136 is received. Otherwise, when a received data byte has a sequence number smaller than the value of the L__V(R) register 136 and larger than or equal to the value of the L__V(N) register 135, the RLP controller 131 judges that retransmitted data is received.

The L__V(N) register 135 stores the sequence number of the damaged data byte (or receive-failed data byte) out of the data to be received. That is, the L__V(N) register 135 stores the first sequence number of the data byte to be received next out of the consecutively received data bytes. The value stored in the L__V(N) register 135 is reported to the transmitter and then stored in the L__V($N_R$) register 139 of the transmitter. The L__V(R) register 136 stores the sequence number of the new data byte to be received next. The L__B(N) register 143 stores a reference sequence number of a block calculated using the value stored in the L__V(N) register 135. The B($N_R$) register 144 stores a 9-bit sequence number used when transmitting B grouped data bytes out of the data bytes having the sequence number stored in the L__B(N) register 143. Therefore, when B data bytes are grouped out of the data bytes having the sequence number determined according to the addition results of the sequence number B(N) stored in the L__B(N) register 143 and the sequence number stored in the B(N) register 144, a 9-bit sequence number to be attached is {B(N) register's value+1} modulo $2^9$. The L__B(N) register 143 and the B(N) register 144 correspond to the L__B(N) register 141 and the B($N_R$) register 142 in the transmitter, respectively.

Since it is not possible for the transmitter in FIG. 3 to exactly know the sequence number stored in the L__V(N) register 135, it can merely know the last reported value stored in the L__V(N) register 135. However, the values stored in the L__B(N) register 143 and the N(B) register 144 of the receiver are multiples of B and the difference between them is also a multiple of B. Therefore, when the 9-bit sequence number stored in the transmitter's B($N_R$) register 142 is provided to the receiver, the receiver can exactly determine the 19-bit sequence number depending on the provided 9-bit sequence number. One object of the present invention is to transmit 19 bits using a 9-bit sequence number even though each block originally has a 19-bit sequence number.

The operation of generating an RLP frame of variable length and transmitting/receiving the generated RLP frame according to an embodiment of the present invention can be broadly divided into the operation performed by the multiplexing/demultiplexing controllers 140 and 240, and the operation performed by the RLP processors 130 and 230. Since the multiplexing/demultiplexing controllers 140 and 240 have the same operation and the RLP processors 130 and 230 also have the same operation, a description of the operation according to an embodiment of the present invention will be limited to the multiplexing/demultiplexing controller 140 and the RLP processor 130, for simplicity.

A. Tx/Rx Operation of the Multiplexing/Demultiplexing Controller

1. Tx Operation of the Multiplexing/Demultiplexing Controller

It is possible to simultaneously transmit not only packet data but also various other types of information, including voice data, over a presently connected physical channel. Therefore, any process providing data to be transmitted to the multiplexing/demultiplexing controller will be referred to as a "service". Further, the transmission unit that the multiplexing/demultiplexing controller 140 and the physical layer processor 150 exchange with each other will be referred to as "information bits" or as a "physical frame", and the transmission unit that the upper layer service blocks, including the RLP processor 130, and the multiplexing/demultiplexing controller 140 exchange with each other will be referred to as "RLP frame" or "data block".

The multiplexing/demultiplexing controller 140 of the transmission side should generate the information bits to be transmitted to the physical layer processor 150 and transmit the generated information bits every set time (e.g., 20 ms). That is, the multiplexing/demultiplexing controller 140 should generate information bits to be filled in a payload of the frame to be transmitted over the physical channel with respect to all the presently connected physical channels and transmit the generated information bits. The IS-2000 specification defines a fundamental channel (FCH), a dedicated control channel (DCCH) and a supplemental channel (SCH). The multiplexing/demultiplexing controller 140 transmits the following fields, when transmitting the generated information bits to the physical layer processor 150 in order to transmit the generated information bits over any one of the fundamental channel, the dedicated control channel and the supplemental channel.

SDU (Service Data Unit): This field is filled with the information bits to be actually transmitted. If there is no information bit to be transmitted, this field is filled with a null value previously determined between the multiplexing/demultiplexing controller and the physical layer.

FRAME__SIZE: This field is filled with the size information of the physical channel frame in which the information bits are filled. When the SDU field is filled with the null value, this field value is ignored in the physical layer.

FRAME__RATE: This field indicates a transmission rate of the physical channel frame in which the information bits are filled. When the SDU field is filled with the null value, this field value is ignored in the physical channel.

When the multiplexing/demultiplexing controller 140 of the transmission side transmits the above field values to the physical layer processor 150, the physical layer processor 150 processes the provided values in the designated coding and demodulation method and then transmits the processed results to the receiving side.

To generate the payload or information bits of a logical transmission unit to be transmitted to the physical channel, the multiplexing/demultiplexing controller 140 of the transmission side uses a data block to be transmitted in the services corresponding to the physical channel to which the logical channel is presently connected. The service corresponding to the physical channel to which the logical channel is connected, refers to a service which can transmit its data block to the physical channel which will transmit the presently generated information bits. A process for connecting such a service between the mobile station and the base station and connecting the logical channel for the service to the physical channel is available with the signaling message and the signaling procedure, defined by the IS-2000 specification.

The multiplexing/demultiplexing controller 140 of the transmission side receives the data block of a proper length (see FIG. 5A) from the service according to a priority order, upon deciding to transmit the data block for the services corresponding to the physical channel to which the logical channel is presently connected. The multiplexing/demultiplexing controller 140 creates a service identifier and a multiplex frame MuxPDU (see FIG. 5B) in which the length information is attached to the data block, so that it is possible to know the service for transmitting the data block received from the multiplexing/demultiplexing controller of the receiving side when receiving the data block from the service. The multiplex frame MuxPDU can include several data blocks and signaling messages provided from several services. A CRC (Cyclic Redundancy Code) for checking errors can be attached to every one or several MuxPDUs. When the CRC for checking errors is added every several MuxPDUs, one CRC and a portion of the information bits protected by the CRC are called a "logical transmission unit (LTU)", as shown in FIG. 5C. When the CRCs are inserted such that the information bits to be transmitted to the physical layer are segmented into several portions and error checking is performed on every segmented portion, it is said that a "logical transmission unit is used". Here, each portion of the segmented information bits is referred to as a "logical transmission unit", and the remaining portion of the logical transmission unit excluding the CRC, protected by the CRC, will be referred to as "a payload of the logical transmission unit" (FIG. 5C) (one or several MuxPDUs). This logical transmission unit becomes a base unit for determining whether the physical frame is correctly received by the multiplexing/demultiplexing controller on the receiving side. The size of the LTUs is always fixed but the size can be defined according to the standard. If the logic transmission unit is not used, a basic unit for determining whether the physical frame is correctly received becomes the information bits.

The multiplexing/demultiplexing controller 140 of the transmission side should previously know the possible transmission rate and the size of the information bits with respect to the physical channel to be presently transmitted, and should also know whether the logic transmission unit is used or not, the size of the logic transmission unit if it is used, and a CRC generation method. Such a configuration is used both to determine the size of the information bits generated by the multiplexing/demultiplexing controller 140 according to the present condition of the physical channel provided from the physical layer, and to determine a method for generating the logic transmission unit, within a limit previously determined between the mobile station and the base station. If it is decided to use the logic transmission unit, the multiplexing/demultiplexing controller 140 of the transmission side fills the payload of the logic transmission unit with MuxPDUs including a data block, fills the remaining portion with the fill MuxPDU or the fill bit pattern in order to make the LTU the fixed size, and then generates a CRC for the payload of the generated logic transmission unit. The multiplexing/demultiplexing controller 140 on the transmission side repeats the above process as many times as the required number of the logic transmission units, sequentially fills the information bits with the generated logic transmission units, fills the remaining portion with 0's, and then provides the resulting information bits to the physical layer processor 150.

If it is decided not to use the logic transmission unit, the multiplexing/demultiplexing controller 140 fills the information bits with MuxPDU including a data block, fills the remaining portion with the fill MuxPDU or the fill bit pattern, and then transmits the generated information bits to the physical channel.

When there are no more data blocks to be transmitted, the multiplexing/demultiplexing controller 140 uses the MuxPDU to which is attached a specific service identifier previously appointed with the multiplexing/demultiplexing controller of the receiving side, or uses a regular bit pattern previously appointed with the multiplexing/demultiplexing controller of the receiving side, in order to fill the remaining portion of the information bits. Herein, the MuxPDU to which the specific service identifier is attached will be referred to as "fill MuxPDU" and the regular bit pattern will be referred to as "fill bit pattern".

In the above process, when there is no signaling message or data block received from the services corresponding to the physical channel to which the logical channel is connected, and from the signaling message generator, the multiplexing/demultiplexing controller 140 operates differently according to the physical channel to be presently transmitted. That is, the multiplexing/demultiplexing controller 140 transmits a null value to SDU for the dedicated control channel or the supplemental channel. For the fundamental channel, the multiplexing/demultiplexing controller 140 transmits, as the information bits, a regular bit pattern previously appointed with the multiplexing/demultiplexing controller of the receiving side to the physical channel. Herein, the regular bit pattern will be referred to as "null traffic".

'A null data block' is transmitted to indicate that the service has no data block to transmit to the multiplexing/demultiplexing controller of the transmission side. The null data block is a data block with no contents, and is used only for a special purpose.

2. Rx Operation of Multiplexing/Demultiplexing Controller

The physical layer processor 150 of the receiving side, shown in FIG. 2, analyzes a received signal using a designated decoding and demodulation method, and transmits the information bits filled in the received physical frame to the multiplexing/demultiplexing controller 140 of the receiving side. The physical layer controller 150 transmits the following information, when transmitting the analyzed information bits to the multiplexing/demultiplexing controller 140.

SDU: This field is filled with the information bits to be actually transmitted. If there is no received information bit or a damaged frame is received, this field is filled to with a null value previously determined between the multiplexing/demultiplexing controller 140 and the physical layer processor 150.

FRAME_QUALITY: This field indicates whether or not the received frame is a valid frame.

FRAME_SIZE: This field is filled with the size information of the received physical channel frame. This field value is determined according to a transmission rate of the received physical channel frame.

FRAME_RATE: This field is filled with the transmission rate of the received physical channel frame.

The multiplexing/demultiplexing controller 140 of the receiving side should previously know the transmission rate and size (length and number) of the information bits with respect to the presently received physical channel, and should also know whether the logic transmission unit is used or not, the size of the logic transmission unit if it is used, and a CRC generation method. Such a configuration can be determined according to the above information provided from the physical channel processor 150 within a limit previously appointed between the mobile station and the base station.

If the physical channel processor 150 of the receiving side fills the SDU with the null value, judging that no physical channel frame is received, and fills in the FRAME_QUALITY field so as to indicate that a valid frame is received, then the multiplexing/demultiplexing controller 140 of the receiving side informs all the services corresponding to the physical channel to which the logical channel is connected that no frame is received.

When the physical layer processor 150 of the receiving side does not fill the SDU with the null value or fills in the FRAME_QUALITY field so as to indicate that a damaged frame is received, the multiplexing/demultiplexing controller 140 of the receiving side determines whether the logic transmission unit is used for the received frame, based on the configuration and the information provided from the physical layer processor 150 of the receiving side.

If the logic transmission unit is used, the multiplexing/demultiplexing controller 140 of the receiving side determines the length of the logic transmission unit, a CRC checking method and the number of logic transmission units. The multiplexing/demultiplexing controller 140 divides the received information bits into as many logic transmission units as the number of logic transmission units. Since the multiplexing/demultiplexing controller 140 previously knows the length and number of the logic transmission units, it can separate out the logic transmission units by dividing the received information bits into the groups as many as the number of the logic transmission units.

When the assigned physical channel transmits the received information bits, the multiplexing/demultiplexing controller 140 of the receiving side determines whether the received information bits are damaged or not, depending on the FRAME_QUALITY field transmitted from the physical channel. If the received information bits are damaged and the received information bits are segmented into several logic transmission units, the multiplexing/demultiplexing controller 140 analyzes the CRC of each logic transmission unit again, separated in the above process, to determine whether there exist error-free logic transmission units.

If there exists an erroneous logic transmission unit, the multiplexing/demultiplexing controller 140 informs all the services corresponding to the physical channel to which the logic channel is connected that a damaged data block is received, with respect to the erroneous logic transmission unit. The LTU may correspond to more than one data block. At this point, the multiplexing/demultiplexing controller 140 also informs the respective services of the maximum length of the corresponding service data block included in the damaged logic transmission unit, with respect to the respective services. If the size of the LTU is known, the maximum value of the data block can be calculated by subtracting the size of MUX PDU header from the size of the LTU.

When the received information bits are damaged and LTUs are not used (meaning that the received information bits have no CRC for checking an error every one or several MuxPDUs), the multiplexing/demultiplexing controller 140 of the receiving side informs all the services corresponding to the physical channel to which the logical channel is connected that a damaged data block is received. At this point, the multiplexing/demultiplexing controller 140 also informs the respective services of the maximum length of the corresponding service data block which can be included in the damaged logic transmission unit, with respect to the respective services.

When an error-free logic transmission unit or information bits is received, the multiplexing/demultiplexing controller 140 of the receiving side separates out error-free MuxPDUs from the fill bit pattern in the information bits. If the separated MuxPDU is not the null traffic or the fill MuxPDU, the multiplexing/demultiplexing controller 140 transmits the data block included in the MuxPDU and a length of the data block to the service designated by the service identifier of the MuxPDU.

After the receiving process, if an error-free logic transmission or information bit is received and there is null traffic on a logical channel of a service, the multiplexing/demultiplexing controller 140 of the receiving side informs the respective service that a null data block is received.

B. Tx/Rx Operation of the Multiplexing/Demultiplexing Controller

A transmitting/receiving operation of the multiplexing/demultiplexing controller 140 according to an embodiment of the present invention will be more apparent from the following detailed description. The IS-2000 standard specifies several dedicated traffic channels such as a fundamental channel, a supplemental channel and a dedicated control channel. Therefore, the transmitting and receiving operation of the multiplexing/demultiplexing controller 140 according to an embodiment of the invention may be described separately for two cases. One where it is applied to the fundamental channel and another case it is applied to the supplemental channel. Since the dedicated control channel can be applied to a special case where the fundamental channel operates only at 96.Kbps or 14.4 Kbps, a separate description of the dedicated control channel will be avoided herein. Further, the operation may be separately described for the case where the logic transmission unit is used and the other case where the logic transmission unit is not used. Here, the case where the logic transmission unit is used corresponds to a case where data is coded using a convolutional code before transmitting and receiving the data, and the case where the logic transmission unit is not used corresponds to a case where the data is coded using a turbo code before transmitting and receiving the data.

1. Information Bit Number of the Fundamental Channel and Supplemental Channel

Prior to describing an operation according to an embodiment of the present invention, the information bit number of the fundamental channel and the information bit number of the supplemental channel specified by the IS-2000 standard are first shown in Tables 1 to 4. More specifically, Tables 1 and 2 show the information bit number of the fundamental channel specified by the IS-2000 standard, and Tables 3 and 4 show the information bit number of the supplemental channel. Tables 1 and 3 show the information bit number of Rate Set 1 based on the transmission rate of 9600 bps, and Tables 2 and 4 show the information bit number of Rate Set 2 based on the transmission rate of 14400 bps.

TABLE 1

Information Bit Number of IS-2000 Fundamental Channel (Rate Set 1)

| Transmission Rate | Information Bit Number |
|---|---|
| 9600 bps | 172 bits |
| 4800 bps | 80 bits |
| 2700 bps | 40 bits |
| 1500 bps | 16 bits |

TABLE 2

Information Bit Number of IS-2000 Fundamental Channel (Rate Set 2)

| Transmission Rate | Information Bit Number |
|---|---|
| 14400 bps | 267 bits |
| 7200 bps | 125 bits |
| 3600 bps | 55 bits |
| 1800 bps | 21 bits |

TABLE 3

Information Bit Number of IS-2000 Supplemental Channel (Rate Set 1)

| Transmission Rate | Information Bit Number |
|---|---|
| 9600 bps | 172 bits |
| 19200 bps | 360 bits |
| 38400 bps | 744 bits |
| 76800 bps | 1512 bits |
| 153600 bps | 3048 bits |
| 307200 bps | 6120 bits |
| 614400 bps | 12264 bits |

TABLE 4

Information Bit Number of IS-2000 Supplemental Channel (Rate Set 2)

| Transmission Rate | Information Bit Number |
|---|---|
| 14400 bps | 267 bits |
| 28800 bps | 552 bits |
| 57600 bps | 1128 bits |
| 115200 bps | 2280 bits |
| 230400 bps | 4584 bits |
| 460800 bps | 9192 bits |
| 1036800 bps | 20712 bits |

It should be noted that Tables 1 to 4 have not shown all the information bit sizes specified by the IS-2000 standard.

When the LTU (Logic Transmission Unit) is used corresponding to the information bit numbers having a sufficient number of bits shown in Tables 3 and 4, the size and number of the LTUs may be calculated as shown in Tables 5 and 6 below. At this point, the information bit number may be calculated by adding the bits remaining after multiplying the size of the LTU by the number of the LTU.

TABLE 5

LTU Applied to Supplemental Channel (Rate Set 1)

| Transmission Rate | LTU Size | LTU Number | Remaining Bits |
|---|---|---|---|
| 9600 bps | — | None | — |
| 19200 bps | — | None | — |
| 38400 bps | 368 bits | 2 | 8 bits |
| 76800 bps | 376 bits | 4 | 8 bits |
| 153600 bps | 376 bits | 8 | 40 bits |
| 307200 bps | 760 bits | 8 | 40 bits |
| 614400 bps | 1528 bits | 8 | 40 bits |

TABLE 6

LTU Applied to Supplemental Channel (Rate Set 2)

| Transmission Rate | LTU Size | LTU Number | Remaining Bits |
|---|---|---|---|
| 14400 bps | — | None | — |
| 28800 bps | — | None | — |
| 57600 bps | 560 bits | 2 | 8 bits |
| 115200 bps | 568 bits | 4 | 8 bits |
| 230400 bps | 568 bits | 8 | 40 bits |
| 460800 bps | 1144 bits | 8 | 40 bits |
| 1036800 bps | 2584 bits | 8 | 40 bits |

It should be noted in Tables 5 and 6 that the LTU is not used for the first two transmission rates. That is, when the supplemental channel having such transmission rates is connected, the multiplexing/demultiplexing controllers of the transmission side and the receiving side follow the information bit processing rule.

The MuxPDU formats proposed in an embodiment of the invention to fill the information bits are shown in Tables 7 to 12 below. Tables 7 and 8 show the MuxPDU formats for the information bits of the fundamental channel (FCH). Tables 9 and 11 show the MuxPDU formats for the information bits of the supplemental channel (SCH), for the case where the LTU is used. Tables 10 and 12 show the MuxPDU formats for the information bits of the supplemental channel, for the case where the LTU is not used. As described above, the dedicated control channel is applied to a special case where only the transmission rate of 9600 bps or 1400 bps is permissible to the supplemental channel, the dedicated control channel permits only the MuxPDU format corresponding to the transmission rates of 9600 bps or 14400 bps, in Table 7 and 8 below.

TABLE 7

MuxPDU format for Information Bits of FCH (Rate Set 1)

| Tx Rate | $1^{st}$ Service Data Block | Signaling Message | Service Data Block | Service Identifier | MuxPDU Header |
|---|---|---|---|---|---|
| 9600 bps | 171 bits | — | — | — | '0' |
| 9600 bps | 80 bits | 80 bits | — | — | '0001' |
| 9600 bps | 40 bits | 128 bits | — | — | '0101' |
| 9600 bps | 16 bits | 152 bits | — | — | '1001' |
| 9600 bps | — | 168 bits | — | — | '1101' |
| 9600 bps | 80 bits | — | 85 bits | 3 bits | '0011' |
| 9600 bps | 40 bits | — | 125 bits | 3 bits | '0111' |
| 9600 bps | 16 bits | — | 149 bits | 3 bits | '1011' |
| 9600 bps | — | — | 165 bits | 3 bits | '1111' |
| 4800 bps | 80 bits | — | — | — | — |
| 2700 bps | 40 bits | — | — | — | — |
| 1500 bps | 16 bits | — | — | — | — |

TABLE 8

MuxPDU format for Information Bits of FCH (Rate Set 2)

| Tx Rate | $1^{st}$ Service Data Block | Signaling Message | Service Data Block | Service Identifier | MuxPDU Header |
|---|---|---|---|---|---|
| 14400 bps | 266 bits | — | — | — | '0' |
| | 124 bits | 138 bits | — | — | '00001' |
| | 54 bits | 208 bits | — | — | '00011' |
| | 20 bits | 242 bits | — | — | '00101' |
| | — | 262 bits | — | — | '00111' |
| | 124 bits | — | 135 bits | 3 bits | '01001' |

TABLE 8-continued

MuxPDU format for Information Bits of FCH (Rate Set 2)

| Tx Rate | 1st Service Data Block | Signaling Message | Service Data Block | Service Identifier | MuxPDU Header |
|---|---|---|---|---|---|
| | 54 bits | — | 205 bits | 3 bits | '01011' |
| | 20 bits | — | 239 bits | 3 bits | '01101' |
| | — | — | 259 bits | 3 bits | '01111' |
| | 20 bits | 222 bits | 17 bits | 3 bits | '10001' |
| 7200 bps | 124 bits | — | — | — | '0' |
| | 54 bits | 67 bits | — | — | '0001' |
| | 20 bits | 101 bits | — | — | '0011' |
| | — | 121 bits | — | — | '0101' |
| | 54 bits | — | 64 bits | 3 bits | '0111' |
| | 20 bits | — | 98 bits | 3 bits | '1001' |
| | — | — | 118 bits | 3 bits | '1011' |
| | 20 bits | 81 bits | 17 bits | 3 bits | '1101' |
| 3600 bps | 54 bits | — | — | — | '0' |
| | 20 bits | 32 bits | — | — | '001' |
| | — | 52 bits | — | — | '011' |
| | 20 bits | — | 29 bits | 3 bits | '101' |
| | — | — | 49 bits | 3 bits | '111' |
| 1800 bps | 20 bits | — | — | — | '0' |
| | — | — | 17 bits | 3 bits | '1' |

In Tables 7 and 8, to the MuxPDU is attached a MuxPDU header which is information for segmenting the data blocks included in the MuxPDU. The MuxPDU header is located at the tail of the MuxPDU to byte-arrange the data blocks.

TABLE 9

MuxPDU format for Information Bits of SCH (Rate Set 1, LTU used)

| Tx Rate | Service Identifier | Length Indicator | Length Type Field | Length Field | Length of Service Data Block |
|---|---|---|---|---|---|
| 38400 bps | 3 bits | '0' | — | — | max 348 bits |
| 38400 bps | 3 bits | '1' | '00' | '0000000' | max 339 bits |
| 76800 bps | 3 bits | '0' | — | — | max 356 bits |
| 76800 bps | 3 bits | '1' | '00' | '0000000' | max 347 bits |
| 153600 bps | 3 bits | '0' | — | — | max 356 bits |
| 153600 bps | 3 bits | '1' | '00' | '0000000' | max 347 bits |
| 307200 bps | 3 bits | '0' | — | — | max 740 bits |
| 307200 bps | 3 bits | '1' | '00' | '0000000' | max 731 bits |
| 614400 bps | 3 bits | '0' | — | — | max 1508 bits |
| 614400 bps | 3 bits | '1' | '00' | '0000000' | max 1499 bits |
| Every Rate | 3 bits | '1' | '01' | 7 bits | max 1019 bits |
| Every Rate | 3 bits | '1' | '10' | 15 bits | max 262131 bits |

TABLE 10

MuxPDU format for Information Bits of SCH (Rate Set 1, LTU unused)

| Tx Rate | Service Identifier | Length Indicator | Length Type Field | Length Field | Length of Service Data Block |
|---|---|---|---|---|---|
| 19200 bps | 3 bits | '0' | — | — | max 356 bits |
| 19200 bps | 3 bits | '1' | '00' | '0000000' | max 347 bits |
| 38400 bps | 3 bits | '0' | — | — | max 740 bits |
| 38400 bps | 3 bits | '1' | '00' | '0000000' | max 731 bits |
| 76800 bps | 3 bits | '0' | — | — | max 1508 bits |
| 76800 bps | 3 bits | '1' | '00' | '0000000' | max 1499 bits |
| 153600 bps | 3 bits | '0' | — | — | max 3044 bits |
| 153600 bps | 3 bits | '1' | '00' | '0000000' | max 3035 bits |
| 307200 bps | 3 bits | '0' | — | — | max 6116 bits |
| 307200 bps | 3 bits | '1' | '00' | '0000000' | max 6107 bits |
| 614400 bps | 3 bits | '0' | — | — | max 12260 bits |
| 614400 bps | 3 bits | '1' | '00' | '0000000' | max 12251 bits |
| Every Rate | 3 bits | '1' | '01' | 7 bits | max 1019 bits |
| Every Rate | 3 bits | '1' | '10' | 15 bits | max 262131 bits |

TABLE 11

MuxPDU format for Information Bits of SCH (Rate Set 2, LTU used)

| Tx Rate | Service Identifier | Length Indicator | Length Type Field | Length Field | Length of Service Data Block |
|---|---|---|---|---|---|
| 57600 bps | 3 bits | '0' | — | — | max 540 bits |
| 57600 bps | 3 bits | '1' | '00' | '0000000' | max 531 bits |
| 115200 bps | 3 bits | '0' | — | — | max 548 bits |
| 115200 bps | 3 bits | '1' | '00' | '0000000' | max 539 bits |
| 230400 bps | 3 bits | '0' | — | — | max 548 bits |
| 230400 bps | 3 bits | '1' | '00' | '0000000' | max 539 bits |
| 460800 bps | 3 bits | '0' | — | — | max 1124 bits |
| 460800 bps | 3 bits | '1' | '00' | '0000000' | max 1115 bits |
| 1036800 bps | 3 bits | '0' | — | — | max 2564 bits |
| 1036800 bps | 3 bits | '1' | '00' | '0000000' | max 2555 bits |
| Every Rate | 3 bits | '1' | '01' | 7 bits | max 1019 bits |
| Every Rate | 3 bits | '1' | '10' | 15 bits | max 262131 bits |

TABLE 12

MuxPDU format for Information Bits of SCH (Rate Set 2, LTU unused)

| Tx Rate | Service Identifier | Length Indicator | Length Type Field | Length Field | Length of Service Data Block |
|---|---|---|---|---|---|
| 28800 bps | 3 bits | '0' | — | — | max 548 bits |
| 28800 bps | 3 bits | '1' | '00' | '0000000' | max 539 bits |
| 57600 bps | 3 bits | '0' | — | — | max 1124 bits |
| 57600 bps | 3 bits | '1' | '00' | '0000000' | max 1115 bits |
| 115200 bps | 3 bits | '0' | — | — | max 2276 bits |
| 115200 bps | 3 bits | '1' | '00' | '0000000' | max 2267 bits |
| 230400 bps | 3 bits | '0' | — | — | max 4580 bits |
| 230400 bps | 3 bits | '1' | '00' | '0000000' | max 4571 bits |
| 460800 bps | 3 bits | '0' | — | — | max 9188 bits |
| 460800 bps | 3 bits | '1' | '00' | '0000000' | max 9179 bits |
| 1036800 bps | 3 bits | '0' | — | — | max 20708 bits |
| 1036800 bps | 3 bits | '1' | '00' | '0000000' | max 20699 bits |
| Every Rate | 3 bits | '1' | '01' | 7 bits | max 1019 bits |
| Every Rate | 3 bits | '1' | '10' | 15 bits | max 262131 bits |

In Tables 7 to 12, the service identifier can be defined as shown in Table 13 below. The order of services (i.e., 1st service, etc.) is defined when connecting the service for the first time (according to the IS-2000 standard). The signaling message indicates the IS-2000 signaling message. The length type field means the length of the length field.

TABLE 13

Service Identifier

| Service Identifier | Service |
|---|---|
| '000' | Reserved |
| '001' | 1st Service |
| '010' | 2nd Service |
| '011' | 3rd Service |
| '100' | 4th Service |
| '101' | 5th Service |
| '110' | 6th Service |
| '111' | Null Service |

In Table 13, the "null service" is a previously determined specific service identifier used to inform the multiplexing/demultiplexing controller of the receiving side that the MuxPDU is the fill MuxPDU. As can be appreciated from Table 13, the MuxPDU formats of Tables 7 to 12 can identify the data blocks provided from maximum 6 services.

Tables 7 and 8 show the MuxPDU formats transmitted on the fundamental channel. Here, the $1^{st}$ service can be identified depending on only the MuxPDU header without the service identifier, because the case where the MuxPDU header is '0' corresponds to the $1^{st}$ service. The data blocks corresponding to the $2^{nd}$ to $6^{th}$ services can be determined depending on the service identifiers of Table 7. Therefore, the service identifiers of Table 7 can have the values of '010' to '110'. When the data block of the $1^{st}$ service is filled with all 1's in the fundamental channel using the MuxPDU format of Table 7, the multiplexing/demultiplexing controller of the receiving side appoints the null traffic which does not correspond to any service in the multiplexing/demultiplexing controller of the transmission side. Therefore, when the MuxPDU received from the fundamental channel has only the data block of the $1^{st}$ service and the data block is filled with all 1's, the multiplexing/demultiplexing controller of the receiving side decides the data block is null traffic.

2. The Tx Operation of the Multiplexing/Demultiplexing Controller on the FCH

Figure 9:
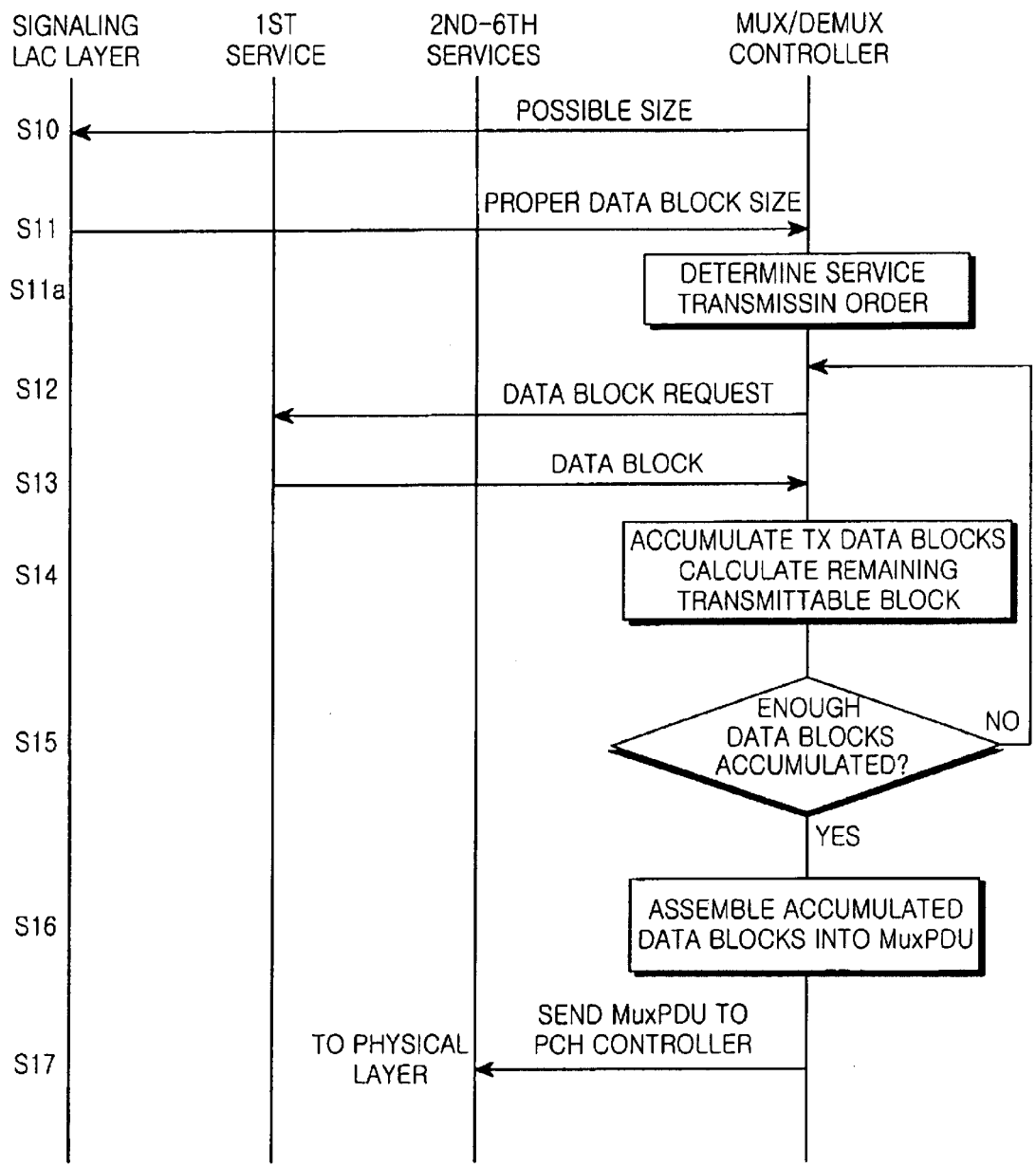
FIG. 9 is a flow diagram illustrating a procedure for transmitting the fundamental channel according to an embodiment of the present invention.

Assuming that the 6 services using the RLP are connected, the multiplexing/demultiplexing controller of the transmission side operates as follows. This operation is performed according to the procedure shown in FIG. 9.

First, the multiplexing/demultiplexing controller 140 of FIG. 3 determines the transmitting order of the services and the size of the data blocks according to a QoS (Quality of Service) guarantee rule. That is, the multiplexing/demultiplexing controller inquires of a signaling LAC (Link Access Control) layer about a possible size (Step S10 of FIG. 9), and receives information about a proper size for the data block from the signaling LAC layer (Step S11). The multiplexing/demultiplexing controller determines the order of transmitting the services (Step S11a), requests the $1^{st}$ service to provide a data block of the determined size (Step S12), and receives the data block within or equal to the determined size from the $1^{st}$ service (Step S13). For a data block to be transmitted to the fundamental channel, the RLP processor should be requested to generate the data block of a proper size according to the size and number of the data blocks that the MuxPDU permits in Table 7 or 8, and a combination of them. It should be noted that not only the RLP processor but also a plurality of protocols can be the LAC layer or $1^{st}$ service. Thereafter, the multiplexing/demultiplexing controller accumulates the data blocks to be transmitted and calculates the remaining blocks which can be transmitted (Step S14). Next, the multiplexing/demultiplexing controller determines whether or not it is possible to assemble the MuxPDU using the accumulated data blocks (Step S15). If it is not possible to assemble the MuxPDU, the multiplexing/demultiplexing controller returns to step S12 to request the corresponding service to provide the data block, and is provided with the requested data block. Otherwise, if it is possible to assemble the MuxPDU, the multiplexing/demultiplexing controller assembles the MuxPDU using the accumulated data blocks (Step S16). The multiplexing/demultiplexing controller selects a proper bit pattern from Table 4 and attaches the selected bit pattern to the MuxPDU header. The multiplexing/demultiplexing controller transmits the generated MuxPDU to the physical channel in the information bits (Step S17).

For the RLP processor which has failed to generate a data block in the above process, the multiplexing/demultiplexing controller requests the RLP processor to generate a blank data block so as to enable the RLP processor to know the fact that it has failed to have the opportunity. In addition, if every RLP processor has provided no data block in the above process, the multiplexing/demultiplexing controller assembles the null traffic and transmits it as the information bits to the physical channel.

3. Rx Operation of the Multiplexing!Demultiplexing Controller on the FCH

The multiplexing/demultiplexing controller of the receiving side operates as follows with respect to the information bits transmitted over the fundamental channel. This operation is performed according to the procedure shown in FIG. 10. The multiplexing/demultiplexing controller analyzes the transmission rate and the MuxPDU header of the received information (Step S20 of FIG. 10), and distinguishes the data blocks (Steps S21 and S22) based on the analysis. To distinguish the data blocks, reference should be made to Tables 7 and 8 according to the Rate Sets. If the last 1 bit of the received information bits is set to '0', all the information bits other than the last 1 bit constitute a data block of the first service, so that it is transmitted to the first service together with the length information of the data block (Step S23).

Otherwise, when the last 1 bit of the received information bits is set to '1' in the above process, the multiplexing/demultiplexing controller of the receiving side regards the last 4 bits as the MuxPDU for the Rate Set 1, and regards the last 5 bits as the MuxPDU for the Rate Set 2. A combination having a bit pattern of the MuxPDU is searched from Table 7 or 8. If there is no combination having the same bit pattern, the multiplexing/demultiplexing controller of the receiving side considers the received information bits as damaged bits. Otherwise, if there exists a combination having the same bit pattern, the multiplexing/demultiplexing controller separates the data block and the service identifier according to the size and position of the data block specified in Table 7 or 8. For example, for the Rate Set 1, if the information bits are received at 9600 bps and the MuxPDU header is '0011', the first 80 bits of the received MuxPDU constitute a data block of the first service, the next 85 bits constitute a data block of another service, and the remaining 3 bits is the service identifier. The service identifier may not exist according to the combinations, as specified in Table 7 or 8.

Figure 10:
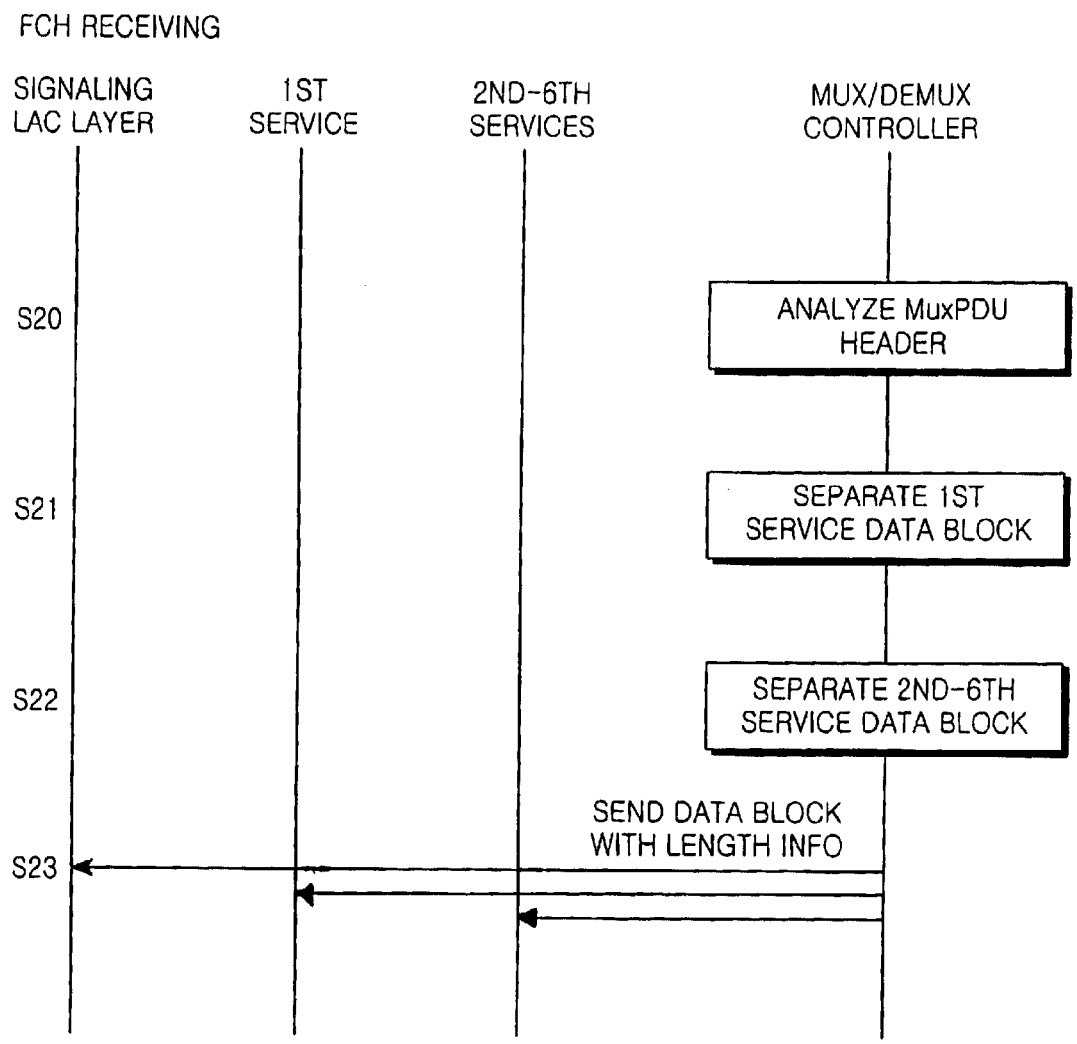
FIG. 10 is a flow diagram illustrating a procedure for receiving the fundamental channel according to an embodiment of the present invention.

The data block separated in the above process is transmitted to the corresponding service with reference to Table 7 or 8 (as shown in step S23 of FIG. 10. It is possible to transmit the data block to the first service and the signaling layer together with the length information of the data block, without analyzing the service identifier. However, if the service identifier is analyzed, the service identifier is compared with Table 13 to transmit the data block to the corresponding service together with the length information of the data block. In this example, the multiplexing/demultiplexing controller of the receiving side transmits the 80-bit data block to the first service together with its length information, and transmits the following 85-bit data blocks to the services indicated by the service identifiers together with each length information. If the service identifier's value is set to '000', '001' or '111', the multiplexing/demultiplexing controller of the receiving side considers the received information bits as damaged bits. If the received information bits are damaged bits, the multiplexing/demultiplexing controller informs all the services which have a logical channel on the fundamental channel, that a damaged data block has been received, and also informs the services of the maximum length of the data block at which the respective services can transmit. For example, for the MuxPDU format of Table 7 used at the Rate Set 1, 171 bits are transmitted to the first service, and 165 bits are transmitted to the second to sixth services.

Otherwise, if the information bits are not damaged, there is only one data block and the data block corresponding to the first service is filled with all 1's, then the multiplexing/demultiplexing controller of the receiving side discards the information bits, regarding them as null traffic, and informs all the services, which have a logical channel on the fundamental channel, that no data block is received. When the information bits are not damaged, and one or more services of the services which have logical channels on the fundamental channel receive no data blocks, the multiplexing/demultiplexing controller of the receiving side informs those services that a null data block is received. It should be noted that for the null traffic, informing receipt of no data block and informing receipt of a null data block may have different meanings according to the service.

4. Tx Operation of the Multiplexing/Demultiplexing Controller on the SCH

When generating the information bits for the supplemental channel, the multiplexing/demultiplexing controller generates as many LTUs as the number shown in Table 5 or 6 according to the transmission rate. The LTU has the size shown in Table 5 or 6. Since the LTU has a 16-bit CRC, the maximum size of the MuxPDU which can be actually transmitted over the LTU varies according to the transmission rates.

For example, when a supplemental channel of 307.2 Kbps is used and the LTU is generated, the payload of the LTU includes the MuxPDU, so that the maximum size of the MuxPDU is 744 bits (as determined by subtracting 16 CRC bits from 760 bits of the LTU payload). When the multiplexing/demultiplexing controller generates the LTU while generating the information bits of the supplemental channel, the possible MuxPDU format according to the Rate Sets are shown in Tables 9 and 11. If the multiplexing/demultiplexing controller generates the MuxPDU to fill up the LTU payload, the multiplexing/demultiplexing controller generates a 16-bit CRC for the LTU payload. The 16-bit CRC is generated in the same manner as a 16-bit CRC generating method which is applied to the supplemental channel. In this manner, the multiplexing/demultiplexing controller generates as many LTUs as the number specified in Table 5 or 6, sequentially puts them in the information bits, and then fills the remaining portion with 0's before transmission to the physical layer processor.

If LTUs are not generated, the multiplexing/demultiplexing controller generates the supplemental channel information bits of a size designated in Table 3 or 4 according to the transmission rate. In this case, for a transmission rate of 9600 bps or 14400 bps, only one MuxPDU having the MuxPDU formats specified in Tables 7 and 8 can be carried by the information bits. In particular, since the supplemental channel can use the format including only one service data block, there are only two actually available formats in Tables 7 and 8, respectively. The multiplexing/demultiplexing controller generates the MuxPDU to fill the information bits with the generated MuxPDU and then transmits the generated information bits/MuxPDU to the physical layer processor.

If LTUs are not generated when generating the information bits of the supplemental channel, the multiplexing/demultiplexing controller can use the MuxPDU formats of Tables 10 and 12 for a transmission rate of over 19200 bps or 28800 bps. The multiplexing/demultiplexing controller generates the MuxPDU to fill the information bits with the generated MuxPDU and then transmits the generated information bits/MuxPDU to the physical layer controller.

Figure 11:
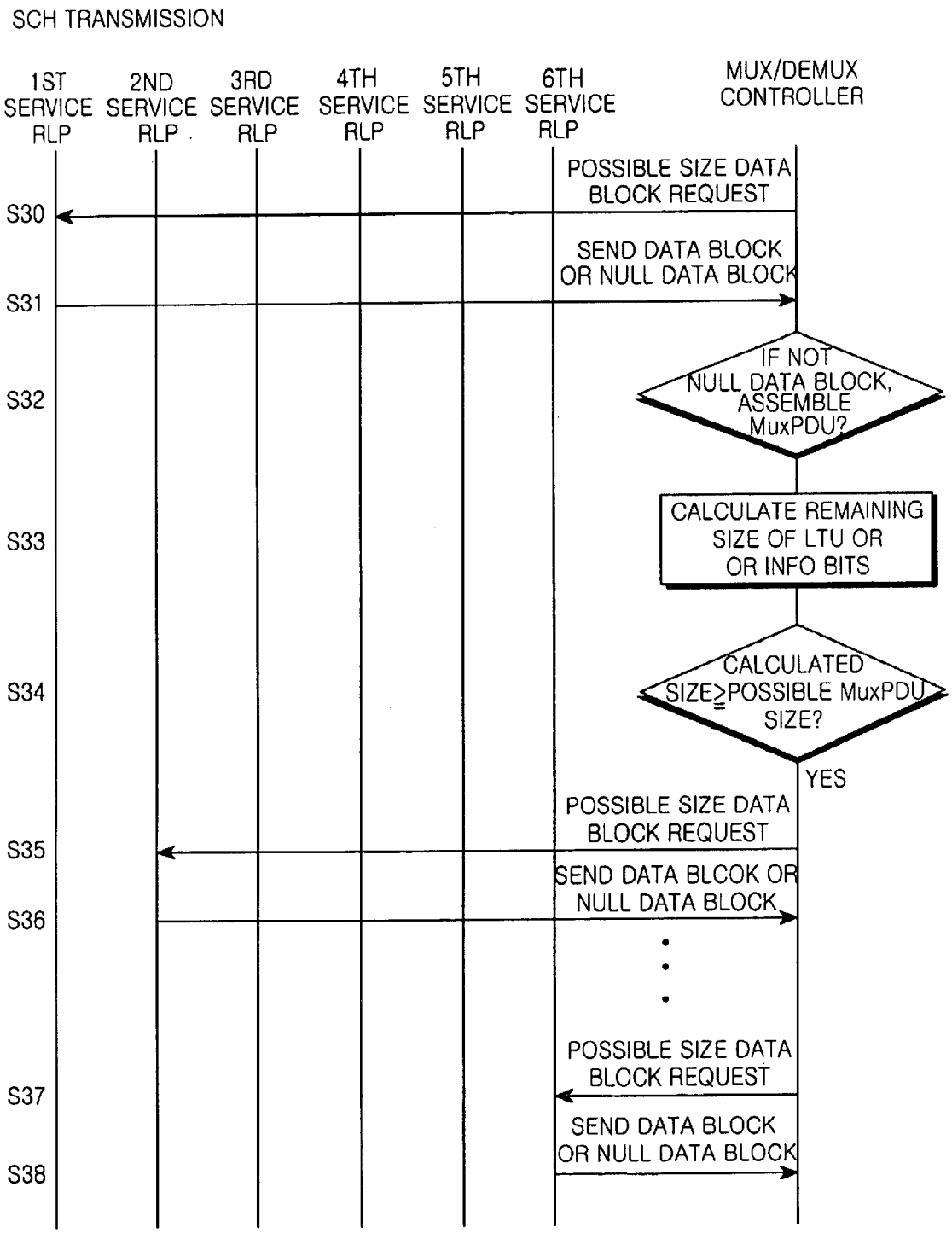
FIG. 11 is a flow diagram illustrating a procedure for transmitting the supplemental channel according to an embodiment of the present invention.

The operation of transmitting on the supplemental channel is performed according to the procedure shown in FIG. 11. The multiplexing/demultiplexing controller determines the order of transmitting the services and the size of the data blocks according to the QoS guarantee rule. Next, the multiplexing/demultiplexing controller sends a data block request to the RLP of the respective services according to the priority order (Step S30 of FIG. 11). That is, the multiplexing/demultiplexing controller sends a possible data block request to the RLP processor of the first service having the top priority (Step S30), and receives a corresponding data block or a null data block from the RLP processor of the first service (Step S31). Upon receipt of the data block rather than the null data block, the multiplexing/demultiplexing controller generates the MuxPDU using the received data block (Step S32). The generated MuxPDU is finally assembled into the information bits.

If LTUs are generated when generating the information bits of the supplemental channel, the multiplexing/demultiplexing controller should request the RLP processor to generate a data block of proper size according to the size of the data block permitted by the MuxPDU in Table 9 or 11 and the remaining portion of the LTU which is presently being generated. That is, upon receipt of the data block, the multiplexing/demultiplexing controller calculates the size of the LTU or the remaining portion of the information bits (Step S33), and determines whether the calculated size is larger than or equal to the possible size of the MuxPDU (Step S34). If the calculated size is larger than or equal to the possible size of the MuxPDU, the multiplexing/demultiplexing controller sends a request for the data block of the possible size to the RLP processor of the second service having the next top priority (Step S35), and receives a corresponding data block or a null data block from the RLP processor of the second service (Step S36). If the calculated size is less than the possible size of the MuxPDU in step S34, the multiplexing/demultiplexing controller requests a data block from the next block. This operation is repeatedly performed on the RLP processors of all the services. Steps S33–S36 also apply when LTUs are not generated.

If LTUs are not generated when generating the information bits of the supplemental channel, the multiplexing/demultiplexing controller requests the respective services to generate a data block which can be transmitted to the supplemental channel specified in Tables 7 and 8 according to the priority order for the transmission rate of 9600 bps or 14400 bps, in order to generate one MuxPDU format which can be transmitted to the supplemental channel, out of the MuxPDU formats specified in Tables 7 and 8. If any one of the services generates a data block, the multiplexing/demultiplexing controller assembles this into the MuxPDU.

For the transmission rate of 19200 bps or 28800 bps, if LTUs are not generated when generating the information bits of the supplemental channel, the multiplexing/demultiplexing controller should request the RLP processor to generate a data block of proper size according to the data block size permitted by the MuxPDU in Table 10 or 12 and the remaining portion of the LTU which is presently generated (Steps S32 to S38).

If the multiplexing/demultiplexing controller fills the LTU payload or the information bits while generating the information bits of the supplemental channel, the multiplexing/demultiplexing controller should know the LTU payload which is not yet filled and the length of the remaining portion of the information bits. The multiplexing/demultiplexing controller requests the services to generate a data block for the remaining portion. If a data block which is not a null data block is received from a certain service, the multiplexing/demultiplexing controller operates according to the length of this data block, as follows.

1. If the length of the received data block is shorter by 4 bits than the LTU payload or the remaining portion of the information bits, the multiplexing/demultiplexing controller assembles the MuxPDU by attaching a 3-bit service identifier and a length indicator set to '0' at the head of the data block according to the service from which the data block is received, based on Table 13. The multiplexing/demultiplexing controller puts the generated MuxPDU in the LTU payload or the remaining portion of the information bits thereby to complete the LTU payload or the information bits.

2. If the length of the received data block is shorter by 13 bits than the LTU payload or the remaining portion of the information bits, the multiplexing/demultiplexing controller assembles the MuxPDU by attaching a 3-bit service identifier based on Table 3 and setting the 1-bit length indicator to '1', the 2-bit length type field to '00' and the 7-bit length field to '0000000' and attaching them at the head of the data block according to the service from which the data block is received. The multiplexing/demultiplexing controller puts the generated MuxPDU in the LTU payload or the remaining portion of the information bits thereby to complete the LTU payload or the information bits.

3. If the length of the received data block is shorter by over 14 bits than the LTU payload or the remaining portion of the information bits, the multiplexing/demultiplexing controller assembles the MuxPDU having a 7-bit or 15-bit length field specified in Tables 9 to 12. That is, if the length of the generated data block is shorter than or equal to 1019 bits, the multiplexing/demultiplexing controller attaches the 3-bit service identifier according to the service from which the data block is received, based on Table 13, and sets the 1-bit length indicator to '1', the 2-bit length type field to '01', and the 7-bit length field to a valued determined by subtracting 1 from a value determined by expressing the whole length of the MuxPDU in bytes. The whole length is determined by adding the service identifier, the length indicator, the length type field, the length field and the data block, based on Tables 9 to 12. Otherwise, if the length of the generated data block is longer than 1019 bits, the multiplexing/demultiplexing controller attaches the 3-bit service identifier according to the service from which the data block is received, based on Table 13, and sets the 1-bit length indicator to '1', the 2-bit length type field to '01', and the 15-bit length field to a valued determined by subtracting 1 from a value determined by expressing the whole length of the MuxPDU in bytes. The whole length is determined by adding the service identifier, the length indicator, the length type field, the length field and the data block, based on Tables 9 to 12. If the value determined in this process is not an integer, i.e., if the length of the MuxPDU is not expressed in bytes, the multiplexing/demultiplexing controller discards the data block. Otherwise, if the determined value is an integer, the multiplexing/demultiplexing controller attaches the service identifier, the length indicator, the length type field and the length field at the head of the data block to assemble the MuxPDU. The multiplexing/demultiplexing controller puts the generated MuxPDU in the LTU payload or the remaining portion of the information bits.

The above process is repeatedly performed on the portion remaining after sequentially putting the generated MuxPDU in the payload of the LTU. In the process, if there is no more data blocks of proper size, the multiplexing/demultiplexing controller fills the first 4 bits in the remaining portion by setting the service identifier to '111' and the length indicator to '0', and then sets the remaining portion to all 0's, thereby filling the LTU payload or the information bits.

In the case where LTUs are generated, if as many LTUs are generated as the number specified in Table 5 or 6, the multiplexing/demultiplexing controller sequentially puts all the generated LTUs in the information bits. The multiplexing/demultiplexing controller fills the remaining portion with all 0's as shown in Table 5 or 6, and transmits it to the physical channel processor.

In the case where LTUs are not generated, if the information bits specified in Table 3 or 4 are all filled in the above process, the multiplexing/demultiplexing controller transmits it to the physical layer processor.

Figure 6A:
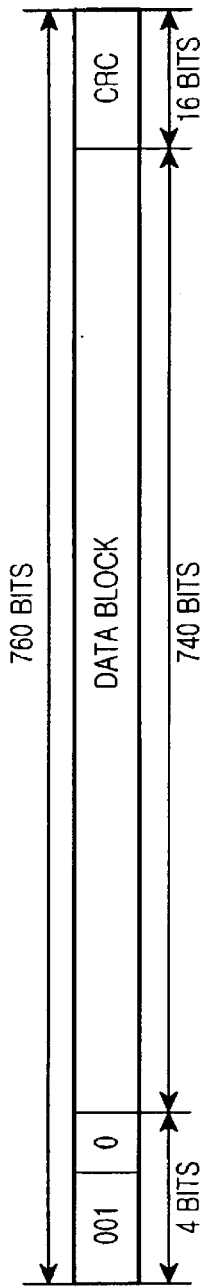
FIGS. 6A to 6C are diagrams illustrating a format of the LTU (Logical Transmission Unit) generated according to an embodiment of the present invention.
Figure 6B:
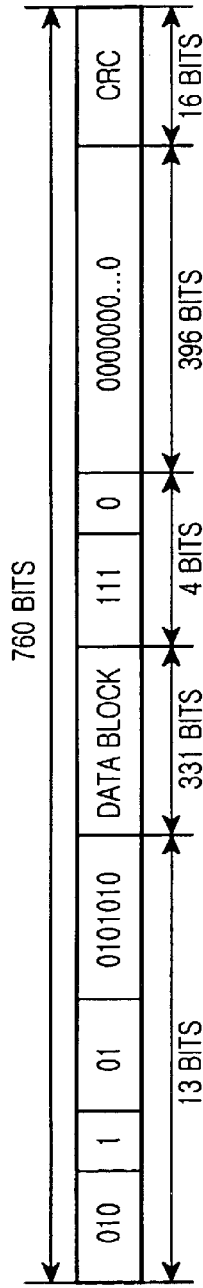
Figure 6C:
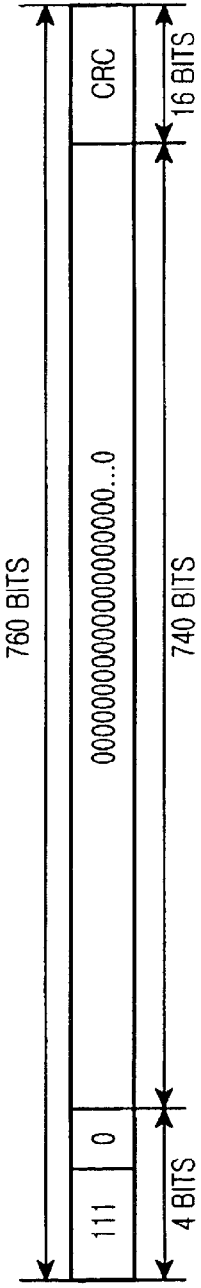

FIGS. 6A to 6C show LTU formats generated according to an embodiment of the present invention. The LTUs constitute an information frame to be transmitted over the physical channel, and each LTU is comprised of a multiplex frame MuxPDU and a CRC. Although the description will be made of the case where the information frame is comprised of LTUs, the information frame can be comprised of only MuxPDUs without the CRC. The consecutive multiplex frames MuxPDUs included in a LTU may have a given length (e.g., 744 bits as shown in FIG. 5C), and each multiplex frame MuxPDU is comprised of a header and a succeeding RLP frame (or data block) as shown in FIG. 5B. The RLP frame includes transmission data. At least one of the multiplex frames MuxPDUs is comprised of a plurality of sub-multiplex frames, and each sub-multiplex frame is comprised of a header including an RLP service identifier field and a length indication field indicating a length of the transmission data, and a succeeding data block. That is, the multiplex frame MuxPDU can be either one sub-multiplex frame comprised of a data block for a specific service and a header indicating the data block, or a plurality of sub-multiplex frames each comprised of a data block for a specific service and a header indicating the data block. FIG. 6A shows a case where the multiplex frame MuxPDU is comprised of one sub-multiplex frame, i.e., includes only one data block. FIG. 6B shows a case where the multiplex frame MuxPDU is comprised of a plurality of sub-multiplex frames, i.e., includes a plurality of data blocks. The operation of generating the data block (or RLP frame) is performed by the RLP controller 131 of FIG. 3, the operation of generating the multiplex frame MuxPDU is performed by the multiplexing/demultiplexing controller 140 of FIG. 3, and the operation of generating the information frame (or physical frame) is performed by the physical layer processor 150 of FIG. 2.

Referring to FIG. 6A, the first LTU corresponds to a case where a 740-bit data block is received from the first service, and is shorter than the LTU payload by 4 bits exactly, so that the service identifier is set to the first service '001', the length indicator is set to '0' and then the payload of the LTU is filled with the received data block. Here, the service identifier, the length indicator and the reserved bits constitute a header of the multiplex frame MuxPDU. As shown in Table 13, the service identifier of '001' indicates that the succeeding data block is for the first service, and the length indicator of '0' indicates that the multiplex frame includes only one data block.

Referring to FIG. 6B, the second LTU corresponds to a case where a 331-bit data block is received from the second service, and is shorter by over 14 bits than the remaining LTU payload and is shorter than 1019 bits, so that the service identifier is set to the second service '010', the length indicator is set to '1', the length type field is set to '01' and then the length field is set to a value '0101010' determined by subtracting one from 43 bytes which is the total length of the MuxPDU. The LTU payload portion of the remaining 50 bytes corresponds to a case where no data block is received from the services. In this case, the fill MuxPDU is generated and put in this portion.

Here, the service identifier, the length indicator and the reserved bits constitute a header of the multiplex frame MuxPDU. The LTU, i.e., the multiplex frame is comprised of two sub-multiplex frames. In the first sub-multiplex frame, the service identifier of '010' indicates that the succeeding data block is for the second service, and the length indicator of '1' indicates that the multiplex frame includes another data block in addition to the data block for the second service, as shown in Table 13. Further, the length type field of '01' indicates the length field and the length of the service data block as shown in Tables 9 to 12. That is, the length indicator, the length type field and the length field constitute a length indication field including length information of the transmission data.

In the second sub-multiplex frame, the service identifier of '111' indicates that the succeeding data block is for a null service, and the length indicator of '0' indicates that the multiplex frame includes no data block in addition to the data block for the null service, as shown in Table 13.

Referring to FIG. 6C, the third LTU corresponds to a case where no data block is provided from the services when generating the LTU. In this case, the fill MuxPDU is generated and put in the LTU. By filling the information bits with the LTUs shown in FIGS. 6A to 6C and setting the remaining bits to '0', generation of the information bits (or information frame) is completed.

5. Rx Operation of the Multiplexing/Demultiplexing Controller on the SCH

Figure 12:
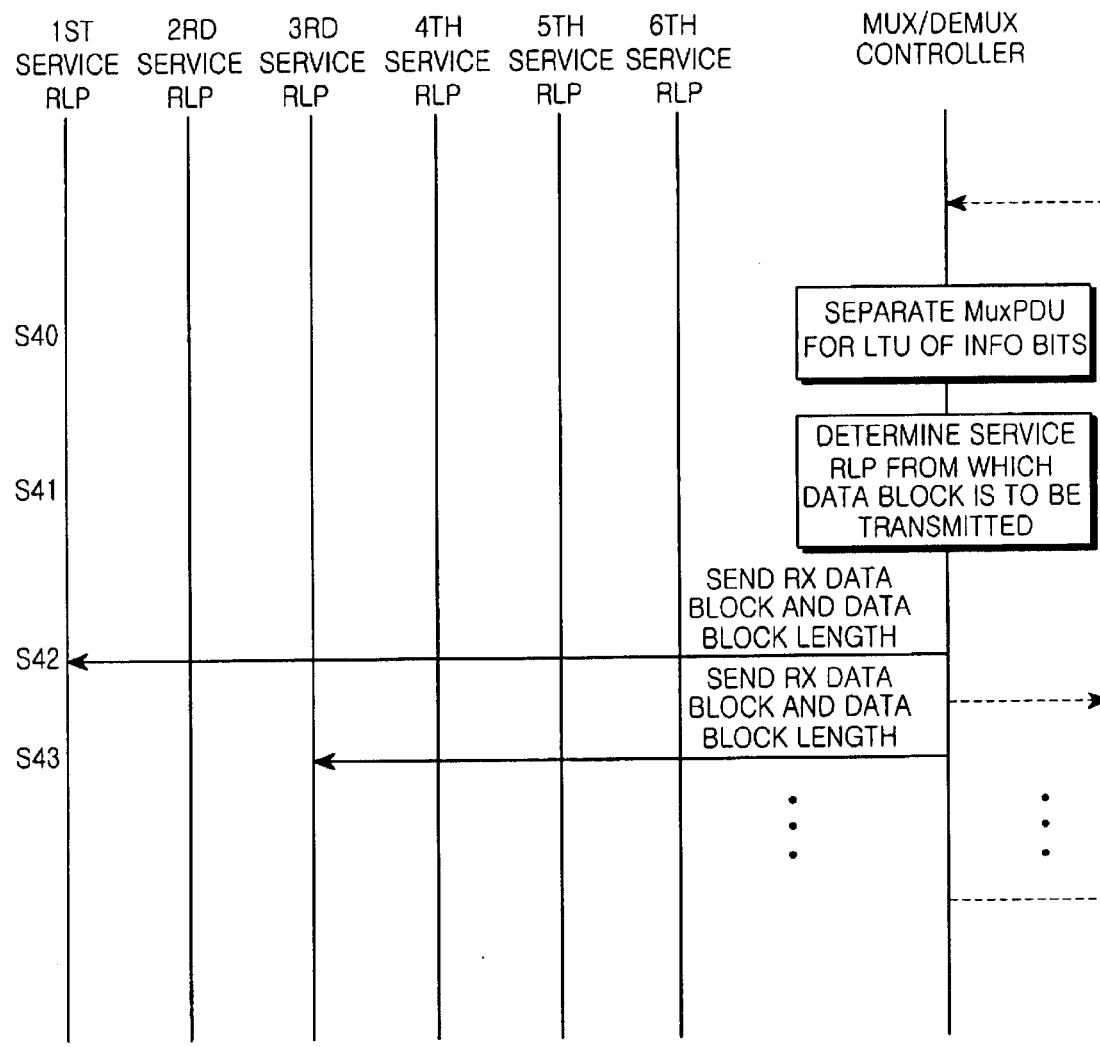
FIG. 12 is a flow diagram illustrating a procedure for receiving the supplemental channel according to an embodiment of the present invention.

The multiplexing/demultiplexing controller of the receiving side operates as follows for the information bits transmitted over the supplemental channel. This operation is performed according to the procedure shown in FIG. 12.

For the information bits using LTUs, the LTU is divided according to the transmission rate as shown in Table 5 or 6. For example, for information bits received over the supplemental channel connected at 307.2 Kbps, the LTU's segmented into a unit of 760 bits as shown in Table 5. If the CRC check shows no errors in the information bits, the multiplexing/demultiplexing controller separates the MuxPDU from each LTU or information bits (Step S40 of FIG. 12). After separating the MuxPDU, the multiplexing/demultiplexing controller determines the RLP of a service to which the data block will be transmitted (Step S41), and transmits the received data block to the RLP of the corresponding service. At this point, the length information of the data block is transmitted together with the received data block (Steps S42 and S43). This operation of transmitting the received data block and the length information of the data block to the RLP of the corresponding service is performed on every separated MuxPDU.

Otherwise, if the information bits have errors, the multiplexing/demultiplexing controller performs CRC checking on each individual LTU. For the error-free LTUs, the multiplexing/demultiplexing controller separates out the MuxPDU. However, for the LTUs having errors, the multiplexing/demultiplexing controller informs all the services which have a logical channel on the supplemental channel, that a damaged data block is received, and also informs those services of the maximum length of the data block that the respective services can transmit in a LTU, and then discards the information bits. For example, the maximum length of the data block to be transmitted in a LTU that was received over the supplemental channel connected at 307.2 Kbps, is 740 bits as shown in FIGS. 6A to 6C.

For the information bits received which were not generated using LTUs, the MuxPDU is separated according to Table 7 or 8 for the transmission rate of 9600 bps or 14400 bps. The MuxPDU separating method is performed in the same manner as in the fundamental channel. However, in the supplemental channel, since only one data block received from the service which has a logical channel corresponds on the supplemental channel can exist in the MuxPDU, the information bits having a different MuxPDU are considered to be damaged.

For the information bits received which were not generated using LTUs, the MuxPDU is separated over the whole information bits for the transmission rate of 19200 bps or 28800 bps. If the information bits have errors, the multiplexing/demultiplexing controller informs all the services, which have a logical channel on the supplemental channel, that a damaged data block is received, and also informs those services of the maximum length of a data block that the respective services can transmit on a LTU, as shown in Table 10 or 12, and then discards the information bits. For example, the maximum length of the data block to be transmitted in a LTU, which was received over the supplemental channel connected at 307.2 Kbps, is 6116 bits as shown in Table 10.

When separating the MuxPDU from the LTU payload or information bits, it is possible to know from FIGS. 6A to 6C to which service the data block of the MuxPDU should be transmitted, depending on the service identifier, the length indicator and the length field, and to know the total length of the received MuxPDU, as follows.

1. The multiplexing/demultiplexing controller of the receiving side begins MuxPDU separation at the head of the LTU payload or the information bits.

2. If the service identifier of the MuxPDU, which is now being analyzed, is set to '111' as shown in Table 13, the multiplexing/demultiplexing controller of the receiving side discards all the remaining portion of the LTU payload or the information bits.

3. If the service identifier of the MuxPDU, which is now being analyzed, is set to '000' as shown in Table 13, the multiplexing/demultiplexing controller of the receiving side considers the LTU payload or the information bits to be damaged.

4. If the service identifier of the MuxPDU, which is now being analyzed, is set to a value between '001' and '110', which indicates one of the services which have a logic channel on the supplemental channel, the next 1-bit length indicator will be analyzed. If the service identifier does not indicate one of the services which have a logic channel on the supplemental channel, the multiplexing/demultiplexing controller will consider the LTU payload or the information bits to be damaged.

5. If the 1-bit length indicator is set to '0', the remaining portion of the LTU payload or the information bits constitutes one MuxPDU. Therefore, a data block from the MuxPDU having a length determined by subtracting 4 bits from the remaining portion's length is transmitted to the upper service.

6. If the 1-bit length indicator is set to '1', the next 2-bit length type field will be analyzed. If the 2-bit length type field is set to '11', the multiplexing/demultiplexing controller of the receiving side will consider the LTU payload or the information bits to be damaged.

7. If the 2-bit length type field is set to '00', the remaining portion of the LTU payload or the information bits constitutes one MuxPDU. Therefore, a data block from the MuxPDU having a length determined by subtracting 13 bits from the remaining portion's length is transmitted to the upper service.

8. If the 2-bit length type field is set to '01', the next 7-bit length field will be analyzed. If a value determined by adding 1 to the 7-bit length is larger than a value determined by expressing in bytes the length of the remaining portion of the LTU payload or the information bits, the multiplexing/demultiplexing controller of the receiving side will consider the LTU payload or the information bits to be damaged.

9. If the value determined by adding 1 to the 7-bit length field is smaller than or equal to the value determined by expressing in bytes the length of the remaining portion of the LTU payload or the information bits, the determined value is the length of the MuxPDU. Therefore, the remaining portion determined by subtracting the first 13 bits from the MuxPDU having a length value determined in the remaining portion of the LTU payload or the information bits is transmitted to the upper service together with its length information.

10. If the 2-bit length type field is set to '10', the next 15-bit length field will be analyzed. If the value determined by adding 1 to the 15-bit length is larger than the value determined by expressing in bytes the length of the remaining portion of the LTU payload or the information bits, the multiplexing/demultiplexing controller of the receiving side will consider the LTU payload or the information bits to be damaged.

11. If the value determined by adding 1 to the 15-bit length field value is smaller than or equal to the value determined by expressing in bytes the length of the remaining portion of the LTU payload or the information bits, the determined value is the length of the MuxPDU. Therefore, the remaining portion determined by subtracting the first 13 bits from the MuxPDU having a length value determined in the remaining portion of the LTU payload or the information bits is transmitted to the upper service together with its length information.

12. If there exists a remaining portion of the LTU payload or the information bits after determining the MuxPDU, the above process will be performed again on the remaining portion.

C. Tx/Rx Operation of the RLP Controller

Data transmission and reception operation performed by the RLP controller 131 shown in FIGS. 3 and 4 will be divided as follows.

1. Operation of the RLP Controller Before Data Transmission

Before starting operation, the RLP controller 131 initializes the L_V(S) register 132, the L_V($N_R$) register 139, the L_V(N) register 135, the L_V(R) register 136 and the E register 134, shown in FIGS. 3 and 4, to '0'. Before starting operation, the RLP controller 131 empties the forward resequencing buffer 133, the NAK list 137 and the rearrange buffer 138. Further, before starting operation, the RLP controller 131 initializes to '0' the L_B($N_R$) register 141, the B($N_R$) register 142, the L_B(N) register 143 and the B(N) register 144. Finally, the RLP controller 131 deactivates all the retransmission-related timers.

Figure 7A:
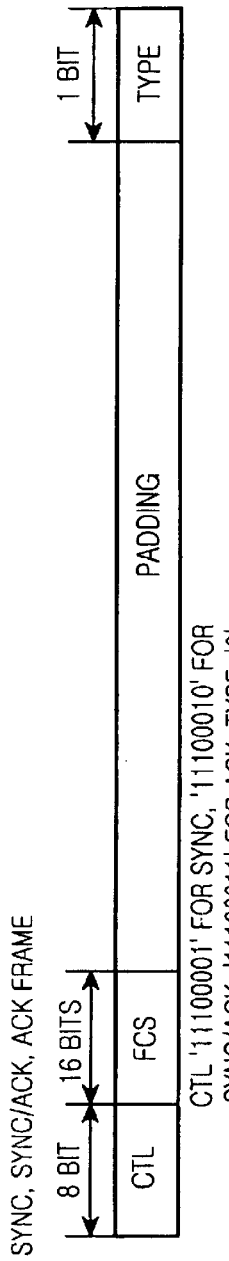
FIGS. 7A to 7F are diagrams illustrating various frame formats used when an RLP frame generated according to the present invention is transmitted and received over the fundamental channel.
Figure 7B:
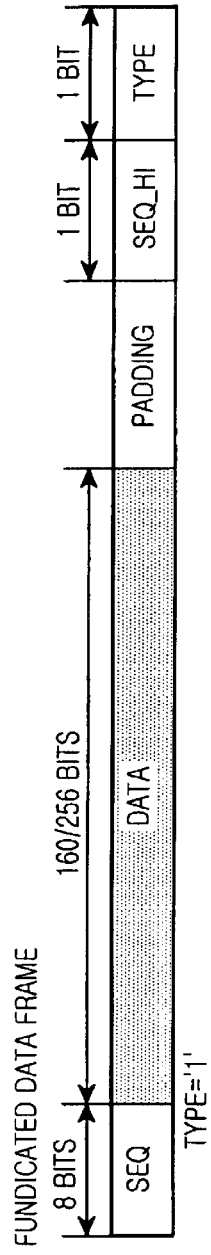
Figure 7C:
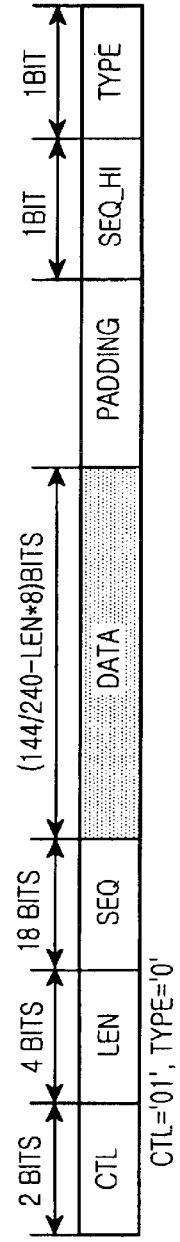
Figure 7D:
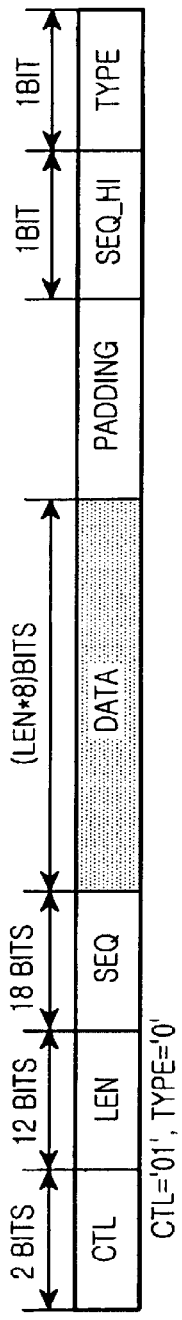
Figure 7E:
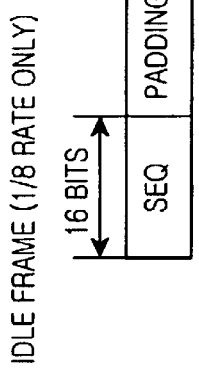
Figure 7F:
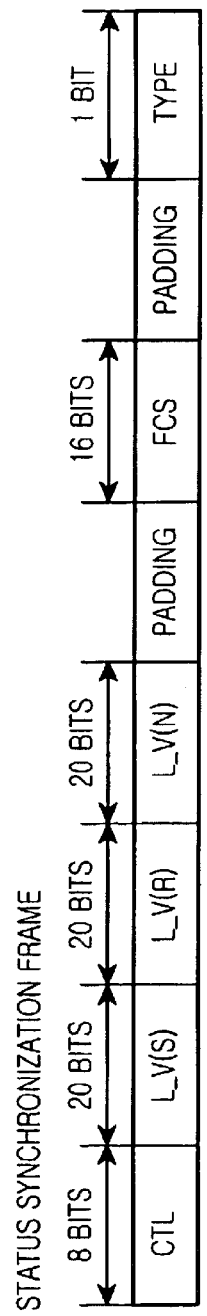
Figure 8A:
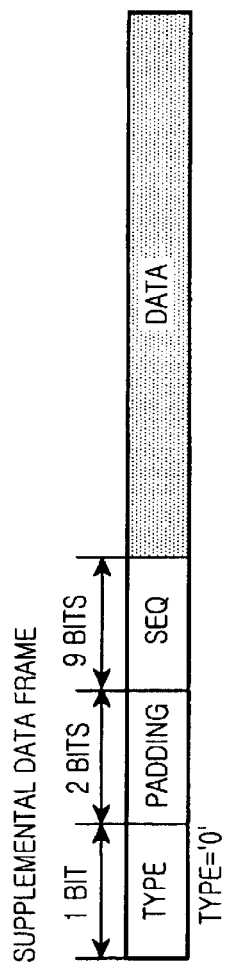
FIGS. 8A to 8c are diagrams illustrating various frame formats used when the RLP frame generated according to an embodiment of the present invention is transmitted and received over the supplemental channel.
Figure 8B:
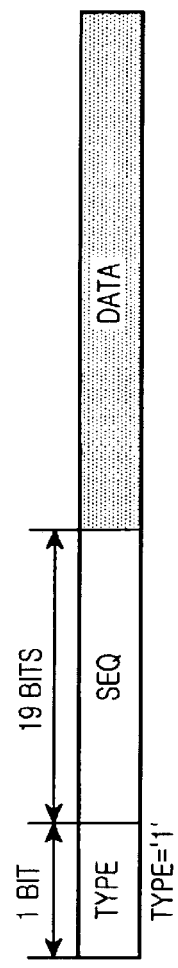
Figure 8C:
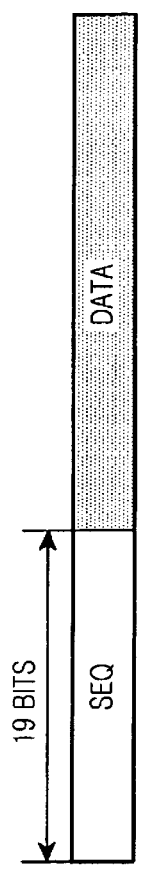

The types of the data blocks (or RLP blocks) that the RLP controller 131 can transmit to the multiplexing/demultiplexing controller are shown in FIGS. 7A to 7F and FIGS. 8A to 8C. More specifically, FIGS. 7A to 7F show the RLP frames which can be transmitted over the fundamental channel, and FIGS. 8A to 8C show RLP frames which can be transmitted over the supplemental channel. In the description below, the RLP frames will be referred to as follows. The SYNC, SYNC/ACK, ACK or NAK frame shown in FIGS. 7A to 7F or Table 14 below will be referred to as a "control frame", and a frame filled with data will be referred to as a "data frame". The data frame is divided into a new data frame filled with new transmission data of at least one byte and a retransmitted data frame filled with retransmission data only. A frame having only a 16-bit SEQ field will be referred to as an "idle frame", and a frame having the value of the L_V(S) register 132 will be referred to as a "status synchronization frame".

In FIGS. 7A to 7F, a maximum of one control frame, data frame or idle frame is available for a data block transmitted over the fundamental channel. FIGS. 7A to 7F show various frames included in the data block which can be transmitted over the fundamental channel. More specifically, FIG. 7A shows a format of control frames (SYNC, SYNC/ACK and ACK frames). FIGS. 7B to 7D show several formats of a data frame. FIG. 7E shows a format of an idle frame. FIG. 7F shows a format of a status synchronization frame.

Referring to FIG. 7A, the control frame is comprised of a 8-bit CTL field and a 16-bit FCS field which are located at the head of the frame, and a 1-bit TYPE field located at the end of the frame. The CTL field is filled with '11100001' for the SYNC frame, filled with '11100010' for the SYNC/ACK frame and filled with '11100011' for the ACK frame. At this point, the TYPE field is filled with '0'.

FIG. 7B shows a format of a data frame corresponding to a case where a data frame is transmitted in a block sequence numbering method. FIGS. 7C and 7D show a format of a data frame corresponding to a case where the data frame cannot be transmitted in the block sequence numbering method. Whether or not the data frame is transmitted in the block sequence numbering method can be determined depending on the value of the TYPE field located at the end of each data frame. As shown in FIG. 7B, when the data frame is transmitted using the block sequence numbering method, the TYPE field is filled with '1'. When the data frame is transmitted without using the block sequence numbering method, the TYPE field, as shown in FIGS. 7C and 7D, is filled with '0'.

Referring to FIG. 7B, the data frame is comprised of a SEQ field, a DATA field, a PADDING field, a SEQ_HI field and a TYPE field. For example, the SEQ field is comprised of 8 bits, the DATA field of 160/256 bits, the SEQ_HI field of 1 bit, and the TYPE field of 1 bit. Although the number of the transmission data bits filled in the DATA field is 160 for the Rate Set 1 and 256 for the Rate Set 2, the fields filled with a sequence number indicating the transmission data, i.e., the SEQ field and the SEQ_HI field can be comprised of 9 bits. This is because the sequence number is not assigned to the transmission data in a byte unit, but assigned to the transmission data in a block unit corresponding to a multiple of a byte unit sequence number.

Referring to FIG. 7C, the data frame is comprised of a CTL field, a LEN field, a SEQ field, a DATA field, a PADDING field, a SEQ_HI field and a TYPE field. For example, the CTL field is comprised of 2 bits, the LEN field of 4 bits, the SEQ field of 18 bits, the DATA field of 144 bits (for the Rate Set 1) and 240 bits (for the Rate Set 2), the SEQ_$_{HI}$ field of 1 bit, and the TYPE field of 1 bit.

Referring to FIG. 7D, the data frame is comprised of a CTL field, a LEN field, a SEQ field, a DATA field, a PADDING field, a SEQ_HI field and a TYPE field. For example, the CTL field is comprised of 2 bits, the LEN field of 12 bits, the SEQ field of 18 bits, the DATA field of (LEN*8) bits, the SEQ_HI field of 1 bit, and the TYPE field of 1 bit. The data frames shown in FIGS. 7C and 7D are both transmitted without using the block sequence numbering method, and are different from each other in the number of the data bits filled in the DATA fields. Because of the difference, they are different from each other in the length of the LEN fields.

Referring to FIG. 7E, an idle frame is comprised of a 16-bit SEQ field and a PADDING field. Referring to FIG. 7F, a status synchronization field is comprised of a CTL field, an L_V(S) field, an L_V(R) field, an L_V(N) field, a PADDING field, an FCS field, a PADDING field, and a TYPE field. The CTL field is filled with '11100101', and the TYPE field is filled with '0'. For example, the CTL field is comprised of 8 bits, the L_V(S) field of 20 bits, the L_V(R) field of 20 bits, the L_V(N) field of 20 bits, the FCS field of 16 bits, and the TYPE field of 1 bit.

In FIGS. 8A to 8C, a maximum of one data frame is available for a data block transmitted over the supplemental channel. FIG. 8A corresponds to a case where the data frame is transmitted according to the block sequence numbering method, and FIGS. 8B and 8C correspond to a case where the data frame is transmitted in the byte sequence numbering method rather than the block sequence numbering method. Whether the data frame to be transmitted over the supplemental channel follows the block sequence numbering method can be determined from the TYPE field of the data frame. When the TYPE field is '0', the data frame follows the block sequence numbering method. When the TYPE field is '1', the data frame does not follow the block sequence numbering method.

Referring to FIG. 8A, the data frame is comprised of a TYPE field, a PADDING field, a SEQ field and a DATA field. The TYPE field is filled with '0'. For example, the TYPE field is comprised of 1 bit, the PADDING field of 2 bits, and the SEQ field of 9 bits.

Referring to FIG. 8B, the data frame is comprised of a TYPE field, a SEQ field, and a DATA field. For example, the TYPE field is comprised of 1 bit, and the SEQ field of 19 bits. Referring to FIG. 8C, the data frame is comprised of the SEQ field and the DATA field. For example, the SEQ field is comprised of 19 bits.

The RLP controller 131 performs a reestablish process before transmitting the data. The RLP controller 131 continuously transmits the SYNC frame to the multiplexing/demultiplexing controller 140 as a data block.

The RLP controller 131 receives the SYNC frame from the multiplexing/demultiplexing controller 140, and continuously transmits the SYNC/ACK frame to the multiplexing/demultiplexing controller 140 until the physical channel frame is received, which is neither a null data block nor a SYNC frame.

Upon receipt of the SYNC/ACK frame, the RLP controller 131 transmits an ACK frame to the multiplexing/demultiplexing controller 140. The RLP controller 131 continuously transmits the ACK frame until a physical channel frame, which is neither a null data block nor a SYNC/ACK frame, is received from the multiplexing/demultiplexing controller 140. The RLP controller 131 starts data transmission, when a physical channel frame is received and the received data block is not a null data block and has an RLP frame which is not a SYNC/ACK frame.

Upon receipt of the ACK frame, the RLP controller 131 starts data transmission. The RLP controller 131 can transmit other frames excepting the SYNC, SYNC/ACK, ACK frames to the multiplexing/demultiplexing controller 140.

2. Data Transmitting Operation of the RLP Controller

For data transmission, the RLP controller 131 uses the 20-bit sequence number register L_V(S) 132. The RLP controller 131 determines a sequence number SEQ to be attached to the frame from the sequence number register L_V(S) 132. The sequence number uses a signless modulo $2^{20}$ operation. For a sequence number N, it is said that the sequence numbers from (N+1) modulo $2^{19}$ to (N+$2^{19}$−1) modulo $2^{20}$ is larger than N, and the sequence numbers from (N−$2^{19}$) modulo $2^{20}$ to (N−1) modulo $2^{20}$ is smaller than N.

When transmitting data, the RLP controller 131 assigns a 20-bit sequence number to every data block. This value is generated by the L_V(S) register 132. The RLP controller 131 always indicates a sequence number of the first data byte when transmitting the frame. The RLP controller 131 can indicate the 19 low bits of the 20-bit sequence number or indicate a 9-bit value as proposed in an embodiment of the invention, to indicate the sequence number of the first data byte.

3. FCH Data Transmitting Operation of the RLP Controller

The multiplexing/demultiplexing controller 140 of the transmission side sends a request for a data block to be transmitted over the fundamental channel to the RLP controller 131 so that the RLP controller 131 generates the frame. The multiplexing/demultiplexing controller 140 of the transmission side also sends size information of the data block to be created by the RLP controller 131, while sending the data block request to the RLP controller 131.

The RLP controller 131 creates the data block to be transmitted over the fundamental channel according to the following priority order.

1. control frame (SYNC, SYNC/ACK, ACK, NAK) or status synchronization frame
2. retransmitted data frame
3. data frame
4. idle frame When there exists a control frame to transmit, the RLP controller 131 creates the control frame as follows. For the SYNC, SYNC/ACK and ACK frames, the RLP controller 131 sets a CTL field according to the frame type and attaches an FCS field thereto, as shown in FIG. 7A. The FCS field is a 16-bit frame check sequence created by a polynomial specified by RFC-1662. The FCS field is created for all the preceding bits. The RLP controller 131 sets the portion following the FCS field to all 0's according to the size information provided from the multiplexing/demultiplexing controller 140. The RLP controller 131 transmits the generated data block to the multiplexing/demultiplexing controller 140.

When there exists data to be retransmitted, the RLP controller 131 generate a NAK frame and transmits it to the multiplexing/demultiplexing controller. The NAK frame has a structure shown in Table 14 below.

TABLE 14

NAK frame

| Field | Length |
| --- | --- |
| CTL | 8 bits |
| NAK_COUNT | 2 bits |
| The next fields are filled as many times as NAK_COUNT + 1 | |
| NAK_TYPE_AND_UNIT | 4 bits |
| When NAK_TYPE_AND_UNIT is '0001', the next fields are filled | |
| FIRST | 20 bits |
| LAST | 20 bits |
| When NAK_TYPE_AND_UNIT is a value defined in Table 15 or 16, the next fields are filled | |
| NAK_MAP_SEQ | 20 bits |
| NAK_MAP | 8 bits |
| The next fields are field for any NAK_TYPE | |
| PADDING_1 | Variable Length |
| FCS | 16 bits |
| PADDING_2 | Variable Length |

In Table 14, the RLP controller 131 creates a NAK frame as follows. The CTL field of Table 14 is set to '11100100'. The RLP controller 131 sets the NAK_COUNT field to a value determined by subtracting one from the retransmission request number included in the NAK frame. The RLP controller 131 performs the (NAK_COUNT+1) retransmission requests. As can be appreciated from Table 14, the retransmission request is comprised of a NAK_TYPE_AND_UNIT field, and FIRST and LAST fields or NAK_MAP_SEQ and NAK_MAP fields according to the value of the NAK_TYPE_AND_UNIT field. When the NAK_TYPE_AND_UNIT field of the retransmission request is set to '0001', the RLP controller 131 fills the FIRST field with the first sequence number for continuously requesting retransmission and fills the LAST field with the last sequence number. The RLP controller 131 may set the NAK_TYPE_AND_UNIT field as shown in Table 15 or 16 below. When the RLP controller 131 sets the NAK_TYPE_AND_UNIT field as shown in Table 15 or 16, the transmission request is performed in a NAK MAP method having the NAK_MAP_SEQ field and the NAK_MAP field.

TABLE 15

NAK_TYPE_AND_UNIT field (Rate Set 1)

| Field Value | Number of Sequence Number |
| --- | --- |
| '0010' | 20 |
| '0011' | 42 |
| '0100' | 43 |
| '0101' | 91 |
| '0110' | 187 |
| '0111' | 379 |
| '1000' | 763 |

TABLE 16

NAK_TYPE_AND_UNIT field (Rate Set 2)

| Field Value | Number of Sequence Number |
| --- | --- |
| '0001' | 32 |
| '0010' | 66 |
| '0011' | 67 |
| '0100' | 139 |
| '0101' | 283 |
| '0110' | 319 |
| '0111' | 571 |
| '1000' | 1147 |
| '1001' | 2587 |
| '1010'–'1111' | Reserved |

The RLP controller 131 fills the NAK_MAP field and NAK_MAP_SEQ field based on Table 15 or 16. The first sequence number is filled in the NAK_MAP_SEQ field, and the sequence numbers for requesting retransmission in the unit shown in Table 15 or 16 are filled in the NAK_MAP field. By using the NAK_MAP, the RLP controller 131 requests retransmission for the data corresponding to the sequence number belonging to (NAK_MAP_SEQ+U−1) modulo $2^{20}$, when the unit determined by the NAK_TYPE_AND_UNIT field is U; and requests retransmission for the data corresponding to the sequence number belonging to (NAK_MAP_SEQ+n*U) modulo $2^{20}$ to (NAK_MAP_SEQ+(n+1)* U−1) modulo $2^{20}$ whenever an nth bit from the most significant bit (MSB) of the NAK_MAP field is '1'. The value 'n' can have a value of 1 to 8. For example, for Rate Set 1, when the NAK_TYPE_AND_UNIT field is set to '0010', the NAK_MAP_SEQ field is set to '0' and the NAK_MAP field is set to '10000000', the RLP controller should retransmit the data of sequence numbers 0 to 39 upon receipt of the field values.

The RLP controller 131 creates the (NAK_COUNT+1) transmission requests and puts them in the NAK frame, pads the FCS field with 0's for byte alignment and then fills the FCS field. The FCS field is a 16-bit frame check sequence created by a polynomial specified in RFC-1662. The FCS field is created for all the preceding bits. After filling the FCS field, the RLP controller 131 fills the remaining portion of the data block with 0's.

When there is retransmission data or new transmission data, the RLP controller 131 may use one of the formats shown in FIGS. 7B to 7D. Please note that the term "fundicate" in FIG. 7B is the compound word of "fundamental" and "dedicated". The format of FIG. 7B is used when it is possible to fill the sequence number of the first data byte carried by itself with 9 bits (8 SEQ bits+1 SEQ_HI bit) using the maximum length of the data carried by itself. The method of decreasing the sequence number of the data carried by itself using the length of the data carried by itself will be referred to as a block unit sequence numbering method. When there is new transmission data, the RLP controller 131 sets the sequence number of the first data byte to the 20-bit sequence number of the first data byte stored in the L_V(S) register 132. The formats of FIGS. 7C and 7D are used when the data cannot be transmitted in the block unit sequence numbering method. Although the formats shown in FIGS. 7C and 7D are equal to each other in that the 19 low bits (18 SEQ bits+1 SEQ_HI bit) of the sequence number of the first data byte to be transmitted are filled therein, they have different data lengths which can be transmitted.

The RLP controller 131 first determines a format of the frame to be created using the sequence number of the first data byte and the amount of the consecutive data to be transmitted. That is, the RLP controller 131 transmits the data using the format of FIG. 7B, when the following conditions are satisfied.

First, a difference between a sequence number S of the first data byte of the consecutive data to be transmitted and a register value corresponding to the present transmission rate out of the values of the L__B($N_R$) register 141 is a multiple of the number C (i.e., a multiple of 20 at Rate Set 1, and a multiple of 32 at Rate Set 2) of data bytes transmitted with the format of FIG. 7B.

Second, the sequence number of the first data byte of the consecutive data to be transmitted is smaller than M determined by Equation 1 below.

Third, when the amount of the consecutive data to be transmitted is larger than or equal to the size C at which the data can be transmitted with the format of FIG. 7B (i.e., when it is larger than 20 or 32 bytes), the format of FIG. 7B can be used. Otherwise, the format of FIG. 7C or 7D is used.

The RLP controller 131 determines the value M using the values stored in the L__B($N_R$) register 141 and the B($N_R$) register 142. The RLP processor 130 has as many L__B($N_R$) registers 141 and the B($N_R$) registers 142 as the number of the sizes of the data block which can be transmitted over the fundamental channel using the format of FIG. 7B or over the supplemental channel using the format of FIG. 8A. The L__B($N_R$) registers 141 are 20-bit registers for storing the maximum value, which is a multiple of the values shown in Tables 17 and 18 below and is smaller than the value of the L__V($N_R$) register 139.

TABLE 17

L__B($N_R$) Registers (Rate Set 1)

| Register | Reverence Value |
| --- | --- |
| L__B($N_R$) [1] | 20 |
| L__B($N_R$) [2] | 42 |
| L__B($N_R$) [3] | 43 |
| L__B($N_R$) [4] | 91 |
| L__B($N_R$) [5] | 187 |
| L__B($N_R$) [6] | 379 |
| L__B($N_R$) [7] | 763 |
| L__B($N_R$) [8] | 1531 |

TABLE 18

L__B($N_R$) Registers (Rate Set 2)

| Register | Reverence Value |
| --- | --- |
| L__B($N_R$) [1] | 32 |
| L__B($N_R$) [2] | 66 |
| L__B($N_R$) [3] | 67 |
| L__B($N_R$) [4] | 139 |
| L__B($N_R$) [5] | 283 |
| L__B($N_R$) [6] | 319 |
| L__B($N_R$) [7] | 576 |
| L__B($N_R$) [8] | 1147 |
| L__B($N_R$) [9] | 2587 |

That is, the L__B($N_R$) registers 141 indicates the 20-bit sequence number that the first byte of each data block can have, when transmitting the data in the unit of its own reference value in the case where a number is sequentially assigned to the infinitively long data beginning at '0'. The B($N_R$) registers 142, which are associated with the L__B($N_R$) registers 141 of Table 17 or 18, are 9-bit registers having a value determined by converting the 20-bit sequence number of the L__B($N_R$) registers 141 to a 9-bit value. The RLP controller 131 calculates the maximum value M using the values stored in the L__B($N_R$) registers 141 in accordance with Equation 1.

$$M = (\text{CEILING}(L\_V(N_R)[R], B) + B \times 2^9) \text{ modulo } 2^{20} \quad (1)$$

In Equation 1, CEILING(a,b) is a function for determining the minimum value which is larger than or equal to 'a' and is a multiple of 'b'. Further, R indicates a present transmission rate, and B indicates the size of the data block which can be transmitted at the present transmission rate R over the fundamental channel using the format of FIG. 7B or over the supplemental channel using the format of FIG. 8A. The L__B($N_R$) [R] register is a register of Table 17 or 18 having the value B as its reference value.

When the format of FIG. 7B is used, the RLP controller 131 first determines a difference D between the 20-bit sequence number L__SEQ of the first data byte and the 20-bit value of the L__B($N_R$) [R] register in order to set the SEQ field. The difference D between 20-bit A and B can be determined using Equation 2 below.

$$D = (A - B + 2^{20}) \text{ modulo } 2^{20} \quad (2)$$

The RLP controller 131 determines the difference value D using Equation 2, in which the 20-bit sequence number value L__SEQ of the first data byte is changed to A and the 20-bit value of the L__B($N_R$) [R] register is changed to B. The RLP controller 131 calculates the 9-bit B__SEQ determined by converting the 20-bit sequence number value L__SEQ of the first data byte using the difference value D, in accordance with Equation 3 below.

$$B\_SEQ = (B(N_R)[R] + \text{FLOORING}(D, C)) \text{ modulo } 2^9 \quad (3)$$

In Equation 3, FLOORING(a,b) is a function for determining the minimum value which is smaller than or equal to D and is a multiple of C. Further, R indicates a present transmission rate, and B indicates the size of the data block which can be transmitted at the present transmission rate R over the fundamental channel using the format of FIG. 7B or over the supplemental channel using the format of FIG. 8A. The B($N_R$) [R] register has a 9-bit value determined by converting the 20-bit sequence number that the L__B($N_R$) registers 141 have. When the format of FIG. 7B is used, the RLP controller 131 sets the SEQ field with the 8 low bits of the determined B__SEQ value and sets the SEQ__HI field with the remaining 1 high bit, so that the receiving side can receive a 9-bit value.

Next, the RLP controller 131 sets a TYPE field to '1' and fills a DATA field with the transmission data.

When the data is transmitted using the format of FIG. 7C or 7D, the RLP controller 131 determines the format of the frame to be created according to the amount of the data to be transmitted. That is, the RLP controller 131 uses the format of FIG. 7C, when the following condition is satisfied. When the amount of the consecutive data to be transmitted is larger than the amount of the data which can be transmitted with the format of FIG. 7C (i.e., it is larger than or equal to 3 bytes at the Rate Set 1 and 15 bytes at the Rate Set 2), the format of FIG. 7C can be used. Otherwise, the format of FIG. 7D is used.

When the format of FIG. 7C is used, the RLP controller 131 sets the SEQ field with 18 low bits of the determined 20-bit sequence number value L__SEQ of the first data byte and sets the SEQ__HI field with 1 second highest bit, so that the receiving side can receive 19 low bits of the 20-bit sequence number value L__SEQ of the first data byte.

Next, the RLP controller 131 sets the TYPE field to '0', sets the CTL field to '01', and then fills the DATA field with the transmission data. It should be noted herein that the DATA field should be filled with at least 3 bytes of the transmission data at the Rate Set 1 and at least 15 bytes of the transmission data at the Rate Set 2. The RLP controller 131 fills the remaining portion from the DATA field to the SEQ_HI field with all 0's.

Subsequently, the RLP controller 131 sets the LEN field to a value determined by subtracting the number of the data bytes from 18 bytes at the Rate Set 1 and from 30 bytes at the Rate Set 2. Therefore, if the LEN field is set to '0', the data has 3 bytes at the Rate Set 1 and 15 bytes at the Rate Set 2. Since as many data bytes are transmitted as the numbers of bytes of data determined by subtracting 18 bytes at the Rate Set 1 and 30 bytes at the Rate Set 2, the receiving side can determine the number of the data bytes transmitted with this LEN field value.

When the format of FIG. 7D is used, the RLP controller 131 first sets the SEQ field with 18 low bits of the 20-bit sequence number L_SEQ of the first data byte and sets the SEQ_HI field to with second highest bit, so that the receiving side can receive 19 low bits of the 20-bit sequence number L_SEQ of the first data byte.

Next, the RLP controller 131 sets the TYPE field to '0', sets the CTL field to '10', and then fills the DATA field with the transmission data. The RLP controller 131 fills the remaining portion from the DATA field to the SEQ_HI field with all O's. Subsequently, the RLP controller 131 sets the LEN filed to the number of the transmission data bytes.

When transmitting the new data, the RLP controller 131 attaches a unique 20-bit sequence number to every byte of the new data frame in the L_V(S) register 132. That is, if the value of the L_V(S) register 132 is S for N-byte transmission data, the first byte of the data will have a sequence S, an nth byte a sequence number of (S+n−1) modulo $2^{20}$ and the last Nth byte a sequence number of (S+N−1) modulo $2^{20}$. After transmitting the N-byte new data, the RLP controller 131 sets the L_V(S) register 132 to (S+N−1) modulo $2^{20}$. The RLP controller 131 increases, only when a data frame filled with the new data is created, the sequence number register L_V(S) 132 by the number of the data bytes filled in the newly created frame. When retransmitting the transmitted data, or when transmitting the control frame, the idle frame or the status synchronization frame, the L_V(S) register 132 is not increased.

The RLP controller 131 stores the newly transmitted data in the forward resequencing buffer 133 together with the sequence number, preparing for a retransmission request from the receiving side. Upon receipt of a retransmission request from the receiving side, the RLP controller 131 searches the forward resequencing buffer 133 for the data byte corresponding to the requested sequence number and retransmits the searched data byte. The RLP controller 131 performs the reestablish process when the increased value of the L_V(S) register 132 is smaller than the value of the L_V($N_R$) register 139.

The RLP controller 131 can transmit the data frame in the format of FIG. 7D, when there is no new data or retransmission data and there is no control frame to be transmitted. In this case, the RLP controller 131 sets the SEQ field of the frame to be transmitted with the 18 low bits of the L_V(S) register 132 and sets the SEQ_HI field with 1 second highest bit (the second bit from the top among the 20 bits), so that the receiving side can receive the 19 low bits of the 20-bit value of the L_V(S) register 132. Thereafter, the RLP controller 131 sets the LEN field to '0', sets the TYPE field to '0', sets the CTL field to '10' and then fills the remaining portion with 0's to create a data block, and transmits the created data block to the multiplexing/demultiplexing controller The RLP controller 131 can transmit an idle frame of FIG. 7E, when the multiplexing/demultiplexing controller 140 requests a data block having a size of 16, 20 or 32 bits, or when there is no new transmission data, retransmission data and control frame. To create the idle frame, the RLP controller 131 fills the SEQ field with the 16 low bits of the L_V(S) register 132. The RLP controller 131 transmits the data block, the remaining portion of which is filled with 0's, to the multiplexing/demultiplexing controller 140.

The RLP controller 131 can transmit the status synchronization frame in the TO format of FIG. 7F at proper time portions. The RLP controller 131 sets the CTL field to '11100101' and sets the L_V(S), L_V(R) and L_V(N) fields to the values of the L_V(S) register 132, the L_V(R) register 136 and the L_V(N) register 135, respectively, when transmitting the status synchronization frame of FIG. 7F.

4. FCH Data Receiving Operation of the RLP Controller

Upon receipt of the SYNC, SYNC/ACK and ACK frames out of the control frames, the RLP controller 131 performs the reestablish process. Upon receipt of the NAK frame out of the control frames, the RLP controller 131 analyzes the NAK frame according to Table 15 and retransmits the requested data bytes.

When the frame in the format of FIG. 7B is received, the RLP controller 131 operates as follows. The RLP controller 131 first determines the 8-bit SEQ field and the 1-bit SEQ_HI field of the received frame, to determine a 9-bit value B_SEQ obtained by attaching the 1-bit SEQ_HI field value to the 8-bit SEQ field value. The RLP controller 131 calculates a sequence number L_SEQ using the B_SEQ value and the data size B with which the format of FIG. 7B can be transmitted, in accordance with Equation 4 below.

$$L\_SEQ=(L\_B(N)[R]+(2^9+B\_SEQ-B(N)[R]) \text{ modulo } 2^9 \times B) \text{ modulo } 2^{20} \quad (4)$$

In Equation 4, R indicates the present transmission rate and B indicates the size of the data block which can be transmitted at the present transmission rate R over the supplemental channel using the format shown in FIG. 7B or the fundamental channel using the format shown in FIG. 8A. The B(N) [R] register has a 9-bit value determined by converting the 20-bit sequence number.

The L_B(N) registers 143 are 20-bit registers for storing the maximum value, which is a multiple of the values shown in Tables 17 and 18 below and is smaller than the value of the L_V(N) register 135. The RLP controller 131 regards the sequence number value L_SEQ as the 20-bit sequence number L_SEQ of the first byte of the received data and regards the data size value B as the number N of the received data bytes.

Upon receipt of the frame filled with the data in the format of FIG. 7C or 7D, the RLP controller 131 regards the 19-bit sequence number value in which the 1-bit SEQ-HI field is attached to the 18-bit SEQ field value, as the sequence number S of the first data byte of the received data, using the 18-bit SEQ field and the 1-bit SEQ_HI field of the received frame. Upon receipt of the frame filled with the data in the format of FIG. 7C or 7D, the RLP controller 131 calculates the 20-bit sequence number L_SEQ of the first byte of the received data using the determined 19-bit sequence number value S, in accordance with Equation 5 below.

The RLP controller 131 regards the L_SEQ value calculated by Equation 5 as the 20-bit sequence number L_SEQ of the first byte of the received data, and calculates the number of the data bytes received from the LEN field included in the frame, to consider the calculated value as N.

When receiving the data, the RLP controller 131 uses L_V(N) register 135, the L_V(R) register 136, and the E register 134, which are the 20-bit sequence number registers. The sequence number register L_V(R) 136 indicates a sequence number of the new data byte to be received next, and the sequence number register L_V(N) 135 indicates a sequence number of a data byte to be received or retransmitted out of the consecutively received data bytes. That is, the RLP controller 131 can transmit data to the upper link protocol at the arrival of the data byte having the sequence number stored in the L_V(N) register 135. The data byte having the sequence number which is larger than or equal to L_V(R) is new data, whereas the data byte having the sequence number which is smaller than L_V(R) and larger than or equal to L_V(N) is retransmission data.

The RLP controller 131 compares the sequence number L_SEQ of the first byte of the received data, the 20-bit sequence number registers L_V(N) 135 and L_V(R) 136, and the sequence number L_SEQ, as follows.

First, when the sequence number L.SEQ is larger than or equal to the L_V(N) register 135 and smaller than L_V(R) register 136, the RLP controller 131 regards this as retransmission data.

Second, when the sequence number L_SEQ is larger than or equal to the L_V(R) register 136 and smaller than a value determined by performing modulo $2^{20}$ operation on the value determined by adding the L_V(R) register 136 to the E register 134, the RLP controller 131 regards this as new data.

Third, when the sequence number L_SEQ is larger than or equal to the value determined by performing modulo $2^{20}$ operation on the value determined by adding the L_V(R) register 136 to the E register 134, the RLP controller 131 regards this as duplicated data.

At the arrival of the data regarded as duplicated data, the RLP controller 131 discards the duplicated data, since it has been previously received.

At the arrival of the data regarded as new data or retransmitted data, the RLP controller 131 attaches the sequence number L starting from the sequence number L_SEQ of each data byte of the received data frame. That is, an nth data byte has a value of (L_SEQ+n−1) modulo $2^{20}$ as the sequence number L, and the first byte has a value of L_SEQ as the sequence number. The RLP controller 131 performs the following operation in the order of the sequence number on the data bytes of the received data frame. Herein, 'n' has a value of 1 to N which is the full length of the received data.

If the received data is regarded as retransmitted data, the RLP controller 131 detects an entry where the sequence number L of the data byte is consistent with the 20-bit sequence number of a stored NAK entry. The RLP controller 131 uses the NAK list 137 shown in FIG. 4. Each entry in the NAK list 137 has a 20-bit sequence number and a field for recording whether a data byte corresponding to the sequence number is received, and has a retransmission timer and an abort timer. The RLP controller 131 detects the NAK entry where the 20-bit sequence number is consistent with the sequence number value L_SEQ of the first data byte of the received data. If there is a detected match with an NAK entry, the RLP controller 131 performs the following operation.

First, when the sequence number L of the received data byte is larger than or equal to L_V(N) and smaller than L_V(R), the RLP controller 131 stores the received data byte in the rearrange buffer 138. If the sequence number value L is equal to L_V(N), the RLP controller 131 transmits to the upper link protocol the data bytes stored in the rearrange buffer 138 from the data byte having the L_V(N) value as the sequence number to the data byte having the sequence number which can be consecutively transmitted. The RLP controller 131 records the fact that a desired data byte is received at the entry which is consistent with the received data byte.

Second, when the sequence number L of the received data byte is equal to L_V(R) and L_V(R) is equal to L_V(N), the RLP controller 131 increases both L_V(R) and L_V(N) and performs modulo $2^{20}$ operation. Otherwise, when the sequence number L of the received data byte is equal to L_V(R) and L_V(R) is not equal to L_VN), the RLP controller 131 increases L_V(R) and performs a modulo $2^{20}$ operation on the result. The RLP controller 131 stores the received data byte in the rearrange buffer 138.

Third, when the sequence number L of the received data byte is larger than L_V(R), the RLP controller 131 creates an entry for each data byte in the NAK list 137 in order to request retransmission for the data byte having (L−1) modulo $2^{20}$ in the sequence number L_V(R). Each entry has the 20-bit sequence number for the corresponding data byte. In addition, the RLP controller 131 stores the received data byte in the rearrange buffer 138 and sets L_V(R) to (L+1) modulo $2^{20}$.

In the meantime, upon receipt of an idle frame, the RLP controller 131 sets the sequence number S to the SEQ field value and calculates the sequence number L_SEQ in accordance with Equation 6 below.

$$L\_SEQ = \{L\_V(R) + [2^{16} + S - (L\_V(R) \text{ modulo } 2^{16})] \text{ modulo } 2^{16}\} \text{ modulo } 2^{20} \quad (6)$$

If the sequence number L_SEQ of the received idle frame is larger than L_V(R), the RLP controller 131 creates an entry for each data byte in the NAK list 137 in order to request retransmission for the data byte having (L_SEQ−1) module 220 in the sequence number L_V(R). Each entry has the 20-bit sequence number for the corresponding data byte. The RLP controller 131 sets L_V(R) to (L+1) modulo $2^{20}$.

Upon receipt of a status synchronization frame, the RLP controller 131 sets the L_V(N) field value filled in the status synchronization frame to the value of the $L_V(N_R)$ register 139. If the L_V(N) field value is smaller than the value of the $L\_V(N_R)$ register 139 that the RLP controller 131 has, the RLP controller 131 performs the reestablish process.

If the value of the $L\_V(N_R)$ register 139 is changed in this process, the RLP controller 131 performs the following operation. That is, the RLP controller 131 updates the $L\_B(N_R)$ registers 141 and the $B(N_R)$ registers 142 according to the value of the $L\_V(N_R)$ register 139, as follows.

First, the RLP controller 131 calculates a difference between the updated value of the $L\_V(N_R)$ register 139 and the value stored in the $L\_B(N_R)$ [R] register, and calculates the maximum value D which is smaller than the difference value and is a multiple of the size B of the data block which can be transmitted at the transmission rate R. The RLP controller 131 adds the calculated D value to the $L\_B(N_R)$ [R] register and performs a modulo $2^{20}$ operation on the result.

Second, the RLP controller 131 adds a value determined by dividing the calculated value D by the size B of the data block to the $B(N_R)$ [R] register and performs a modulo $2^9$ operation on the result.

When the multiplexing/demultiplexing controller 140 informs that a damaged data block is received and also informs the size of the data block, the RLP controller 131 predicts a size M of the data block which can be transmitted over the fundamental channel using the format of FIG. 7B or over the supplemental channel using the format of FIG. 8A, which can be received as shown in Tables 17 and 18. For example, when the damaged data block was transmitted over the fundamental channel and the Rate Set 1 is in use, M becomes 20 bytes. If the damaged data block was transmitted over the fundamental channel and the Rate Set 2 is in use, M becomes 32 bytes. Otherwise, if the damaged data block was transmitted over the supplemental channel, M becomes a value determined by subtracting 12 bits from the L-bit length of the damaged data block informed by the multiplexing/demultiplexing controller 140 and then dividing this value by 8, as shown in Tables 17 and 18. For example, if the informed length of the damaged data block is 740 bits, M=(740−12)/8=91.

After determining the maximum number M of the data bytes of the damaged data block, the RLP controller 131 adds this value to the value stored in the E register 134 and stores again the added value in the E register 134. If the value determined by performing a modulo $2^{20}$ operation on the result from adding the increased E register 134 to the L_V(N) register 135 is smaller than the value of the L_V(N) register 135, the RLP controller 131 performs the reestablish process.

If there exists at least one data block, which is not a null data block and is received correctly, or if the multiplexing/demultiplexing controller 131 informs the RLP processor 131 that no frame is received, the RLP controller 131 sets the E register 134 to '0'.

5. SCH Data Transmitting Operation of the RLP Controller

The multiplexing/demultiplexing controller 140 of the transmission side sends a request for a data block to be transmitted over the supplemental channel to the RLP controller 131 so that the RLP controller 131 generates the frame. The multiplexing/demultiplexing controller 140 of the transmission side also sends the RLP controller 131 the size information of the data block that the RLP controller 131 should create.

The RLP controller 131 creates the data block to be transmitted over the supplemental channel according to the following priority order.

1. retransmission data frame
2. data frame

When there is retransmission data or new transmission data, the RLP controller 131 may use one of the formats shown in FIGS. 8A to 8C. The format of FIG. 8A is used when it is possible to fill the sequence number of the first data byte carried by itself with 9 bits in the block unit sequence numbering method, using the maximum length of the data carried by itself. When there is new transmission data, the RLP controller 131 sets the sequence number of the first data byte to the 20-bit sequence number of the first data byte stored in the L_V(S) register 132.

The formats of FIGS. 8B and 8C are used when data cannot be transmitted in the block unit sequence numbering method. Although the formats shown in FIGS. 7B and 7C are equal to each other in that the 19 low bits of the sequence number of the first data byte to be transmitted are filled therein, they have different data lengths which can be transmitted.

The RLP controller 131 determines the sequence number of the first data byte and the format of the frame to be created using the amount of the consecutive data to be transmitted. That is, the RLP controller 131 transmits the data using the format of FIG. 8A, when the following conditions are satisfied.

First, the difference between a sequence number S of the first data byte of the consecutive data to be transmitted and the register value corresponding to the present transmission rate out of the values of the L_B($N_R$) register 141 is a multiple of the number B of data bytes transmitted with the format of FIG. 7A.

Second, the sequence number of the first data byte of the consecutive data to be transmitted is smaller than M as determined by Equation 1.

Third, when the amount of the consecutive data to be transmitted is larger than or equal to the size B at which the data can be transmitted with the format of FIG. 8A, the format of FIG. 8A can be used. Otherwise, the format of FIG. 8B or 8C is used.

When the format of FIG. 8A is used, the RLP controller 131 first calculates a difference D between the 20-bit sequence number L_SEQ of the first data byte and the 20-bit value of the L_B($N_R$) [R] register in order to set the SEQ field, using Equation 2. The RLP controller 131 calculates the 9-bit B_SEQ value determined by converting the 20-bit sequence number L_SEQ of the first data byte using the difference value D, using Equation 3. The RLP controller 131 sets the SEQ field with the calculated 9-bit B_SEQ value so that the receiving side can receive the 9-bit value. Next, the RLP controller 131 sets the TYPE field to '0', fills the two-bit PADDING field with 0's and then fills the DATA field with the transmission data.

When the formats of FIGS. 8B and 8C are used, the RLP controller 131 determines a format of the frame to be created according to the amount of the transmission data. That is, the RLP controller 131 transmits the data using the format of FIG. 8B, when the following condition is satisfied. When the amount of the consecutive data to be transmitted is smaller by one than the amount of the data which can be transmitted with the format of FIG. 8B (i.e., it is (B−1) bytes), the format of FIG. 8B can be used. Otherwise, the format of FIG. 8C is used.

When the format of FIG. 8B is used, the RLP controller 131 first sets the SEQ field with the 19 low bits of the 20-bit sequence number value L_SEQ of the first data byte so that the receiving side can receive the 19 low bits of the 20-bit sequence number value L_SEQ of the first byte. Next, the RLP controller 131 sets the TYPE field to '1' and fills the DATA field with the transmission data. It should be noted herein that the (B−1) transmission data bytes are filled in the DATA field.

When the format of FIG. 8C is used, the RLP controller 131 first sets the SEQ field with the 19 low bits of the 20-bit sequence number value L_SEQ of the first data byte so that the receiving side can receive the 19 low bits of the 20-bit sequence number value L_SEQ of the first byte. The RLP controller 131 fills the DATA field with the transmission data.

When transmitting new data, the RLP controller 131 attaches a unique 20-bit sequence number to every byte of the new data frame in the L_V(S) register 132. That is, if the value of the L_V(S) register 132 is S for N-byte transmission data, the first byte of the data will have a sequence S, an nth byte a sequence number of (S+n−1) modulo $2^{20}$ and the last Nth byte a sequence number of (S+N−1) modulo $2^{20}$. After transmitting the N-byte new data, the RLP controller 131 sets the L_V(S) register 132 to (S+N−1) modulo $2^{20}$.

The RLP controller 131 increases, only when a data frame filled with new data is created, the sequence number register L_V(S) 132 by the number of the data bytes filled in the newly created frame. When already-transmitted data is being retransmitted, the L_V(S) register 132 is not increased.

The RLP controller 131 stores the newly transmitted data in the forward resequencing buffer 133 together with the sequence number, preparing for a retransmission request from the receiving side. Upon receipt of a retransmission request from the receiving side, the RLP controller 131 searches the forward resequencing buffer 133 for the data byte corresponding to the requested sequence number and retransmits the data byte found in the search. The RLP controller 131 performs the reestablish process when the increased value of the L_V(S) register 132 is smaller than the value of the L_V($N_R$) register 139.

The RLP controller 131 transmits a null data block to the multiplexing/demultiplexing controller 140, when there is no new data, retransmission data or control frame to be transmitted.

6. SCH Data Receiving Operation of the RLP Controller

The multiplexing/demultiplexing controller 140 of the receiving side provides the RLP controller 131 with the data block and information about the size T of the received data block. The RLP controller 131 decides the format of the received data block according to the size information T, as follows.

First, when the size T of the received data block is equal to a value determined by adding 12 to the size B at which the data can be transmitted with the format of FIG. 8A, the RLP controller 131 regards the received data block as a data block in the format of FIG. 8A or 8B. That is, since the format of FIG. 8A has a 12-bit (1+2+9 bits) header, the whole size is always (B×8+12) bits where B is the amount of transmission data. The amount B of the transmission data can have one of the reference values shown in Tables 17 and 18.

Second, when the size T of the received data block is equal to a value determined by adding 12 to the size B at which the data can be transmitted with the format of FIG. 8A, the RLP controller 131 analyzes the first bit of the received data block. If the first bit is '0', the RLP controller 131 regards the received data block as a data block in the format of FIG. 8A. If the first bit is '1', the RLP controller 131 regards the received data block as a data block in the format of FIG. 8B.

Third, when the size T of the received data block is smaller than a value determined by adding 12 to the size B at which the data can be transmitted with the format of FIG. 8A, the RLP controller 131 regards the received data block as a data block in the format of FIG. 8C.

Upon receipt of the frame in the format of FIG. 8A, the RLP controller 131 operates as follows. The RLP controller 131 first calculates a 9-bit SEQ field value B_SEQ of the received frame. The RLP controller 131 calculates a sequence number L_SEQ using the B_SEQ value and the data size B at which the data can be transmitted with the format of FIG. 7B, in accordance with Equation 4. The RLP controller 131 regards the L_SEQ value calculated by Equation 4 as the 20-bit sequence number L_SEQ of the first byte of the received data and regards the data size value B as the number N of the received data bytes.

Upon receipt of a frame filled with data in the format of FIG. 8B or 8C, the RLP controller 131 regards the 19-bit SEQ field value of the received frame as a sequence number S of the first byte of the received data. The RLP controller 131 calculates the 20-bit sequence number L_SEQ of the first byte of the received data from the 19-bit sequence number value S calculated when the frame filled with data in the format of FIG. 8B or 8C is received, in accordance with Equation 5. The RLP controller 131 regards the L_SEQ value calculated by Equation 5 as the 20-bit sequence number L_SEQ of the first byte of the received data, and regards as the number N of the received data bytes a value determined by subtracting 20 bits from the size T of the data block received from the multiplexing/demultiplexing controller 140 and then dividing the subtracted value by 8, when the frame in the format of FIG. 8B is received (or a value determined by subtracting 19 bits from the size value T and then dividing the subtracted value by 8, when the frame in the format of FIG. 8C is received). If the calculated number N of the received data bytes is not 0 or an integer, the RLP controller 131 discards the data block.

When receiving data, the RLP controller 131 uses the L_V(N) register 135, the L_V(R) register 136 and the E register 134, which are the 20-bit sequence number registers. As in the fundamental channel, the sequence number register L_V(R) 136 indicates a sequence number of the new data byte to be received next, and the sequence number register L_V(N) 135 indicates a sequence number of a data byte to be received out of the consecutively received data bytes.

The RLP controller 131 compares the sequence number L_SEQ of the first byte of the received data, the 20-bit sequence number registers L_V(N) 135 and L_V(R) 136, and the sequence number L_SEQ, as follows.

First, when the sequence number L_SEQ is larger than or equal to the L_V(N) register 135 and smaller than L_V(R) register 136, the RLP controller 131 regards this as the retransmission data.

Second, when the sequence number L_SEQ is larger than or equal to the L_V(R) register 136 and smaller than a value determined by performing a modulo $2^{20}$ operation on the value determined by adding the L_V(R) register 136 to the E register 134, the RLP controller 131 regards this as the new data.

Third, when the sequence number L_SEQ is larger than or equal to the value determined by performing a modulo $2^{20}$ operation on the value determined by adding the L_V(R) register 136 to the E register 134, the RLP controller 131 regards this as duplicated data.

At the arrival of the data regarded as the duplicated data, the RLP controller 131 discards the duplicated data, since it is previously received data.

At the arrival of the data regarded as the new data or the retransmitted data, the RLP controller 131 attaches the sequence number L starting from the sequence number L_SEQ of each data byte of the received data frame. That is, an nth data byte has a value of (L_SEQ+n−1) modulo $2^{20}$ as the sequence number L, and the first byte has a value of L_SEQ as the sequence number. The RLP controller 131 performs the following operation in the order of the sequence number on the data bytes of the received data frame.

If the received data is determined to be retransmitted data, the RLP controller 131 detects an entry where the sequence number L of the data byte is consistent with the 20-bit sequence number of the stored NAK entry. The RLP controller 131 uses the NAK list 137 shown in FIG. 4. Each entry in the NAK list 137 has the 20-bit sequence number and a field for recording whether a data byte corresponding to the sequence number is received, and has a retransmission timer and an abort timer. The RLP controller 131 detects the NAK entry where the 20-bit sequence number is consistent with the sequence number value L_SEQ of the first data byte of the received data. If there is a detected NAK entry, the RLP controller 131 performs the following operation.

First, when the sequence number L of the received data byte is larger than or equal to L_V(N) and smaller than L_V(R), the RLP controller 131 stores the received data byte in the rearrange buffer 138. If the sequence number value L is equal to L_V(N), the RLP controller 131 transmits to the upper link protocol the data bytes stored in the rearrange buffer 138 from the data byte having the L_V(N) value as the sequence number to the data byte having the sequence number which can be consecutively transmitted. The RLP controller 131 records the fact that a desired data byte is received at the entry which is consistent with the received data byte.

Second, when the sequence number L of the received data byte is equal to L_V(R) and L_V(R) is equal to L_LV(N), the RLP controller 131 increases both L_V(R) and L_V(N) and performs a modulo $2^{20}$ operation on the result. Otherwise, when the sequence number L of the received data byte is equal to L_V(R) and L_V(R) is not equal to L_V(N), the RLP controller 131 increases L_V(R) and performs a modulo $2^{20}$ operation on the result. The RLP controller 131 stores the received data byte in the rearrange buffer 138.

Third, when the sequence number L of the received data byte is larger than L_V(R), the RLP controller 131 creates an entry for each data byte in the NAK list 137 in order to request retransmission for the data byte having (L−1) modulo $2^{20}$ in the sequence number L_V(R). Each entry has the 20-bit sequence number for the corresponding data byte. In addition, the RLP controller 131 stores the received data byte in the rearrange buffer 138 and sets L_V(R) to (L+1) modulo $2^{20}$.

When the multiplexing/demultiplexing controller 140 informs the RLP controller 131 that a damaged data block is received and also informs the size of the data block, the RLP controller 131 predicts a size M of the data block which can be transmitted over the fundamental channel using the format of FIG. 7B or over the supplemental channel using the format of FIG. 8A, which can be received as shown in Tables 17 and 18. For example, when the damaged data block was transmitted over the fundamental channel and the Rate Set 1 is in use, M is 20 bytes. If the damaged data block was transmitted over the fundamental channel and the Rate Set 2 is in use, M is 32 bytes.

Otherwise, if the damaged data block was transmitted over the supplemental channel, M becomes a value determined by subtracting 12 bits from the L-bit length of the damaged data block informed by the multiplexing/demultiplexing controller 140 and then dividing this value by 8, as shown in Tables 17 and 18. For example, if the informed length of the damaged data block is 740 bits, M=(740−12)/8=91.

After determining the maximum number M of the data bytes of the damaged data block, the RLP controller 131 adds this value to the value stored in the E register 134 and stores again the added value in the E register 134. If the value determined by performing modulo $2^{20}$ addition on the increased E register 134 and the L_V(N) register 135 is smaller than the value of the L_V(N) register 135, the RLP controller 131 performs the reestablish process.

If there exists at least one data block which is not a null data block and is received correctly or if the multiplexing/demultiplexing controller 131 informs that no frame is received, the RLP controller 131 sets the E register 134 to '0'.

7. Operation of RLP Controller After Data Receiving

After processing all the received frames, the RLP controller 131 performs the following operation. When the received data block includes an idle frame or a new data frame, the RLP controller 131 performs the following processes on the entries in the NAK list 137 in the order of the older entries.

First, if an abort timer has not expired yet and the sequence number, included in the NAK entry, has been transmitted three times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry. Otherwise, if the RLP controller 131 has not received the retransmitted data byte corresponding to the sequence number that the NAK entry already has, the RLP controller 131 transmits to the upper link protocol the received data bytes which are larger than the sequence number of the NAK list stored in the rearrange buffer 138 and can be successively transmitted to the upper link protocol, considering that the data byte corresponding to the sequence number of the NAK entry is not received. The RLP controller 131 sets L_V(N) register 135 to the sequence number of the data byte to be received next.

Second, if the abort timer has not expired yet and the sequence number, that the NAK entry has, was included in the NAK which has already transmitted two times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry and sets the L_V(N) register 135 to the sequence number of the data byte to be received next. Otherwise, if the RLP controller 131 has not received the retransmitted data byte corresponding to the sequence number that the NAK entry already has, the RLP controller 131 sets the abort timer of the NAK entry to a proper value. The RLP controller 131 includes the sequence numbers, that the NAK entry has, in the three NAK frames to be transmitted next.

The RLP controller 131 sets the retransmission timer to a proper value for the NAK entries which should be newly added, and includes the sequence numbers, that the NAK entry has, in the two NAK frames to be transmitted next.

If the value of the L_V(N) register 135 is changed in this process, the RLP controller 131 performs the following operation. That is, the RLP controller 131 updates the L_B(N) registers 143 and the B(N) registers 144 according to the value of the L_V(N) register 135, as follows.

First, the RLP controller 131 calculates a difference between the updated value of the L_V(N) register 135 and the value stored in the L_B(N) [R] register, and calculates the maximum value D which is smaller than the difference value and is a multiple of the size B of the data block which can be transmitted at the transmission rate R. The RLP controller 131 adds the calculated D value to the L_BN [R] register and performs a modulo $2^{20}$ operation on the result.

Second, the RLP controller 131 adds a value determined by dividing the calculated value D by the size B of the data block to the B(N) [R] register and performs modulo $2^9$ operation on the result.

As described above, the novel sequence numbering method enables the mobile communication system to transmit a frame in a block unit according to a radio link protocol (RLP) in order to transmit the increased amount of the data, and retransmit a corresponding data block at a retransmission request. The novel sequence numbering method can generate an RLP frame of various sizes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a block sequence number in a communication system for transmitting frames comprising the steps of:

calculating a difference D between a first byte sequence number A of m bits and a second byte sequence number B of m bits, said first byte sequence number A indicating a first byte of transmission data, said second byte sequence number B indicating data of a first byte in a second block succeeding a first block to which the transmission data belongs, using the equation $$D=\{A-B+2^m\} \text{ modulo } 2^m; \text{ and}$$

converting the first byte sequence number A to a block sequence number B_SEQ of n bits smaller in number than m bits using the difference D, using the equation $B\_SEQ=\{B(N_R)+FLOORING(D,C)/C\} \text{ modulo } 2^n$, where FLOORING(D, C) is a function for calculating a minimum value which is less than or equal to D and is a multiple of C, $B(N_R)$ indicates a value determined by converting the second byte sequence number B of m bits to n bits, and C indicates a size of the frame;

wherein each frame is comprised of a block sequence number and a succeeding data field which is filled with data bits having a byte length, the block sequence number being assigned to every block unit corresponding to a multiple of the byte to transmit the increased number of data bits, so that the data bits in at least one of the frames can be error checked in a byte unit at a receiving side.

2. A device for generating a block sequence number in a communication system for transmitting frames, the device comprising:

a first register for storing a first byte sequence number A of m bits indicating a first byte of transmission data;

a second register for storing a second byte sequence number B of m bits indicating data of the first byte in a second block succeeding a first block to which the transmission data belongs; and a controller for calculating a difference D between the first byte sequence number A and the second byte sequence number B, and for converting the first byte sequence number A to a block sequence number B_SEQ of n bits smaller in number than m bits using the difference D;

wherein the difference D is calculated using the equation $$D=\{A-B+2^m\} \text{ modulo } 2^m;$$

wherein the block sequence number B_SEQ is calculated using the equation $B\_SEQ=\{B(N_R)+FLOORING(D,C)/C\} \text{ modulo } 2^n$, where FLOORING(D,C) is a function for calculating a minimum value which is less than or equal to D and is a multiple of C, $B(N_R)$ indicates a value determined by converting the second byte sequence number B of m bits to n bits, and C indicates a size of the frame;

wherein each frame is comprised of a block sequence number and a succeeding data field which is filled with data bits having a byte length, the block sequence number being assigned to every block unit corresponding to a multiple of the byte to transmit the increased number of data bits, so that the data bits in at least one of the frames can be error checked in a byte unit at a receiving side.

3. A method for verifying a byte sequence number in a communication system for transmitting frames, the method comprising the steps of:

receiving at least one frame;

error checking a block sequence number B_SEQ of n bits included in the received frame; and calculating a byte sequence number L_SEQ of m bits indicating a first byte of received data using the error-checked block sequence number B_SEQ and a size value C of the frame;

wherein the byte sequence number L_SEQ is calculated using the equation $L\_SEQ=\{L\_B(N)+(2^n+B\_SEQ-B(N))$ modulo $2^n \times C\}$, where L_B(N) is a reference sequence number of m bits indicating a block corresponding to a byte sequence number of data to be received, and B(N) is a value determined by converting the reference sequence number to n bits;

wherein each frame is comprised of a block sequence number and a succeeding data field which is filled with data bits having a byte length, the block sequence number being assigned to every block unit corresponding to a multiple of the byte to transmit the increased number of data bits.

4. A device for verifying a byte sequence number in a communication system for transmitting frames, the device comprising:

a first register for storing a first byte sequence number L_V(N) of data to be received;

a second register for storing a reference sequence number L_B(N) of m bits indicating a block corresponding to the first byte sequence number;

a third register for storing a value B(N) determined by converting the reference sequence number of m bits to n bits; and a controller for receiving at least one of the frames, for verifying a block sequence number B_SEQ of n bits included in the received frame, and for calculating a byte sequence number L_SEQ of m bits indicating a first byte of received data using the verified block sequence number B_SEQ and a size value C of the frame, for verifying the byte sequence number indicating data bits in a byte unit from the block sequence number in at least one of the frames;

wherein the byte sequence number L_SEQ is calculated using the equation $L\_SEQ=\{L\_B(N)+(2^n+B\_SEQ-B(N))$ modulo $2^n \times C\}$, where L_B(N) is a reference sequence number of m bits indicating a block corresponding to a byte sequence number of data to be received, and B(N) is a value determined by converting the reference sequence number to n bits;

wherein each frame is comprised of a block sequence number and a succeeding data field which is filled with data bits having a byte length, the block sequence number being assigned to every block unit corresponding to a multiple of the byte to transmit the increased number of data bits.

* * * * *